(12) United States Patent
Honsho et al.

(10) Patent No.: US 8,564,892 B2
(45) Date of Patent: Oct. 22, 2013

(54) LENS BARREL WITH FOUR SYMMETRIC AND PARALLEL CONTACT POINTS

(75) Inventors: Hironori Honsho, Hyogo (JP); Hideyuki Hashi, Osaka (JP); Daisuke Ito, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/225,484

(22) Filed: Sep. 5, 2011

(65) Prior Publication Data

US 2012/0063015 A1 Mar. 15, 2012

(30) Foreign Application Priority Data

Sep. 15, 2010 (JP) .................................. 2010-206298
Aug. 5, 2011 (JP) .................................. 2011-172002

(51) Int. Cl.
*G02B 7/02* (2006.01)

(52) U.S. Cl.
USPC ........................................ 359/819; 359/811

(58) Field of Classification Search
USPC ................................................ 359/819, 811
See application file for complete search history.

(56) References Cited

U.S. PATENT DOCUMENTS 7,099,088 B2 * 8/2006 Okuda ........................ 359/696

FOREIGN PATENT DOCUMENTS

| JP | 60-83007 | A | | 5/1985 |
|----|----------|---|---|--------|
| JP | 2002-214505 | A | | 7/2002 |
| JP | 2004-271789 | A | | 9/2004 |
| JP | 2008-216927 | A | | 9/2008 |
| JP | 4211363 | B | | 1/2009 |
| JP | 2004170753 | | * | 8/2012 |
| JP | 2004271789 | | * | 8/2012 |
| JP | 2004170753 | | * | 6/2013 |

* cited by examiner

*Primary Examiner* — Ricky Mack
*Assistant Examiner* — Daniele Manikeu
(74) *Attorney, Agent, or Firm* — Shinjyu Global IP

(57) ABSTRACT

A lens barrel includes a lens frame, a guide shaft, a lead screw, a nut, and a biasing spring. The guide shaft is inserted into the lens frame. The nut is threaded onto the lead screw. The biasing member biases the lens frame toward the nut. The lens frame includes a first bearing component having a first insertion hole and a second bearing component having a second insertion hole. The guide shaft hits an inner peripheral face of the first insertion hole at a first and second contact point, and hits an inner peripheral face of the second insertion hole at a third and fourth contact point. The first and second contact points are disposed on opposing side of the third and fourth contact points using as a reference a parallel plane which extends along the direction of an optical axis and passes through a guide axis.

4 Claims, 20 Drawing Sheets

LENS BARREL WITH FOUR SYMMETRIC AND PARALLEL CONTACT POINTS

CROSS-REFERENCE TO RELATED APPLICATIONS

This application claims priority under 35 U.S.C. §119 to Japanese Patent Application No. 2010-206298, filed on Sep. 15, 2010 and Japanese Patent Application No. 2011-172002, filed on Aug. 5, 2011. The entire disclosure of Japanese Patent Application No. 2010-206298 and Japanese Patent Application No. 2011-172002 are hereby incorporated herein by reference.

BACKGROUND

1. Technical Field

The technology disclosed herein relates to a lens barrel that is configured to support an optical system.

2. Background Information

Recent years have witnessed the growing popularity of digital cameras that make use of a charge coupled device (CCD), complementary metal oxide semiconductor (CMOS) sensor, or other such imaging element to convert an optical image into an electrical signal, and digitize the electrical signal.

With such a digital camera, not only is a higher pixel count needed for the CCD or CMOS sensor, but higher performance is needed for the lens barrel that forms an optical image on the imaging element.

Meanwhile, there is a need to reduce the overall size of the product in the field of digital cameras. Accordingly, there is a need to reduce the size of the lens barrel, which is considered to contribute greatly to reducing the overall size of the product.

To raise the performance and reduced the size of a lens barrel, it is necessary to reduce the size of the drive system that drives the lens group, and to reduce the size of the optical system. Also, to reduce the size of the optical system, high precision is needed in the orientation of the lens group that forms the optical image.

In view of this, many different kinds of lens barrel have been proposed in the past (e.g., see Japanese Laid-Open Patent Application 2004-271789 and Japanese Patent 4,211,363).

SUMMARY

With the lens barrel discussed in Japanese Patent Application 2004-271789, a lens support frame is supported movably in the optical axis direction by a first guide pin and a second guide pin. A dual-plane intersection guide hole is pressed against and guided by the first guide pin by a permanent magnet attached to the first bearing component of the lens support frame.

Also, the rotation of a feed screw rotationally driven by a stepping motor is converted by a rack into linear drive in the optical axis direction. A convex engagement component of the rack is linked to the lens support frame, and the lens support frame is driven in the optical axis direction by the rotation of the feed screw.

There are two types of drive by a feed screw mechanism in a lens drive mechanism. One, for example, is the rack type discussed in Japanese Patent Application 2004-271789, and the other is a nut type. With a rack, the teeth of the rack and the feed screw are in point contact, so teeth with six or more threads are formed on the rack in order to prevent skipping between the teeth of the rack and the feed screw. Accordingly, the size is larger in the optical axis direction, and it has been discovered that this particular feature greatly hinders the effort to reduce the size of the lens barrel. Also, space is required for the permanent magnet used for biasing, and this makes it harder to reduce the size of the lens drive mechanism.

On the other hand, with a nut type, the teeth that mesh with the feed screw are formed continuously in a spiral shape, so the feed screw and the teeth are in linear contact, which means that one to three threads are enough, which helps reduce the size.

As discussed above, when a rack system is employed, it is difficult to reduce the size in the optical axis direction, and adding the permanent magnet for biasing results in a larger structure around the bearings, and the lens drive system ends up being larger. Therefore, even though lens orientation precision can be increased by biasing the guide pins with the permanent magnet, it is difficult to further reduce the size of the lens barrel.

Meanwhile, with the lens drive device discussed in Japanese Patent 4,211,363, a lens frame is biased with a compression spring toward a nut attached to a lead screw, and the lens frame is driven by the rotation of the lead screw.

The biasing force of the compression spring usually must be at least ten times the mass of the lens frame, and high frictional resistance is generated between the nut and the lens frame by this biasing force. With a constitution such as this, a biasing force produced by a magnet and strong enough to go against the frictional resistance is necessary in order to perform biasing toward a guide face with a magnet as in Japanese Patent Application 2004-271789, and this increases the drive load of driving the lens frame. To operate correctly, it has been discovered that the motor used to drive the lead screw and the magnet used for biasing need to be large, thus again making it difficult to reduce the size of the lens barrel.

In accordance with one aspect of the technology disclosed herein, a lens barrel is provided that includes a lens frame, a guide shaft, a lead screw, a nut, a biasing spring. The lens frame is configured to support a lens group having an optical axis. The guide shaft is disposed parallel to the optical axis of the lens group and inserted into the lens frame. The lead screw is disposed parallel to the optical axis. The nut is threaded onto the lead screw, and the biasing member is configured to urge the lens frame toward the nut. The lens frame includes first and second bearing components. The first and second bearing components have first and second insertion holes into which the guide shaft is inserted. The guide shaft is configured to contact an inner face of the first insertion hole at first and second contact points. The guide shaft is further configured to contact an inner face of the second insertion hole at a third contact point and a fourth contact point. The first and second contact points are disposed opposite to the third and fourth contact points with a parallel plane located in-between as a reference. The parallel plane is disposed parallel to the optical axis and passes through a guide axis of the guide shaft.

These and other features, aspects and advantages of the technology disclosed herein will become apparent to those skilled in the art from the following detailed description, which, taken in conjunction with the annexed drawings, discloses a preferred and example embodiments of the present invention.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1: Summary of Digital Camera

Figure 1:
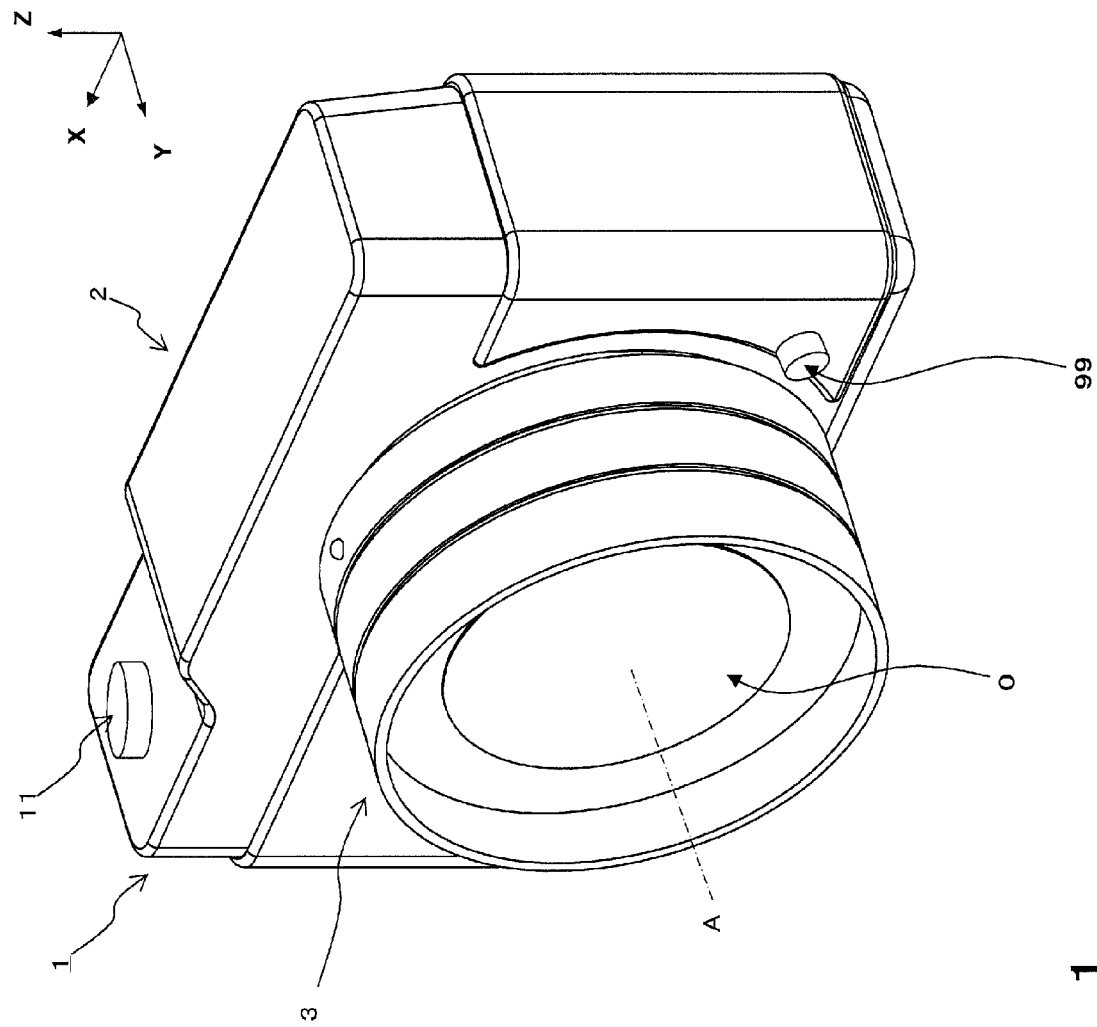
FIG. 1 is a simplified oblique view of a digital camera.
Figure 2:
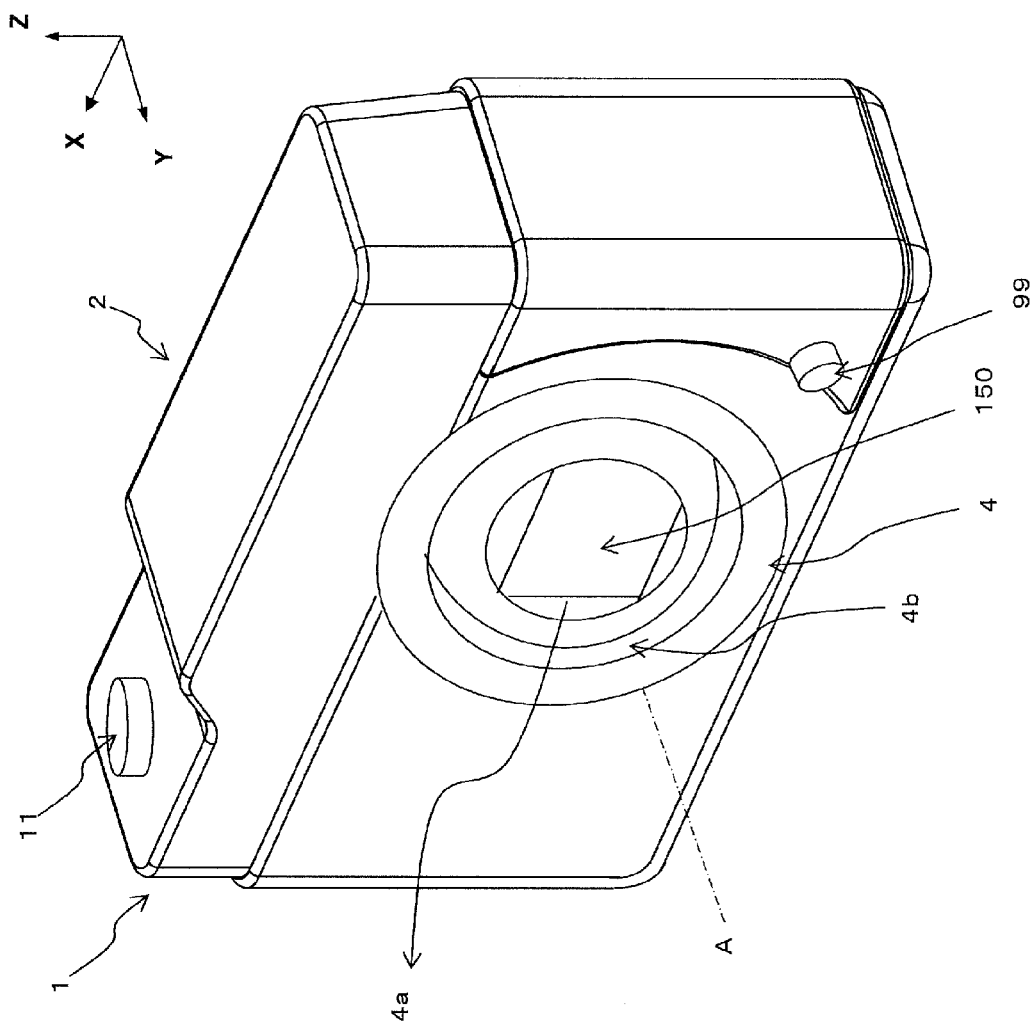
FIG. 2 is a simplified oblique view of a digital camera.
Figure 3:
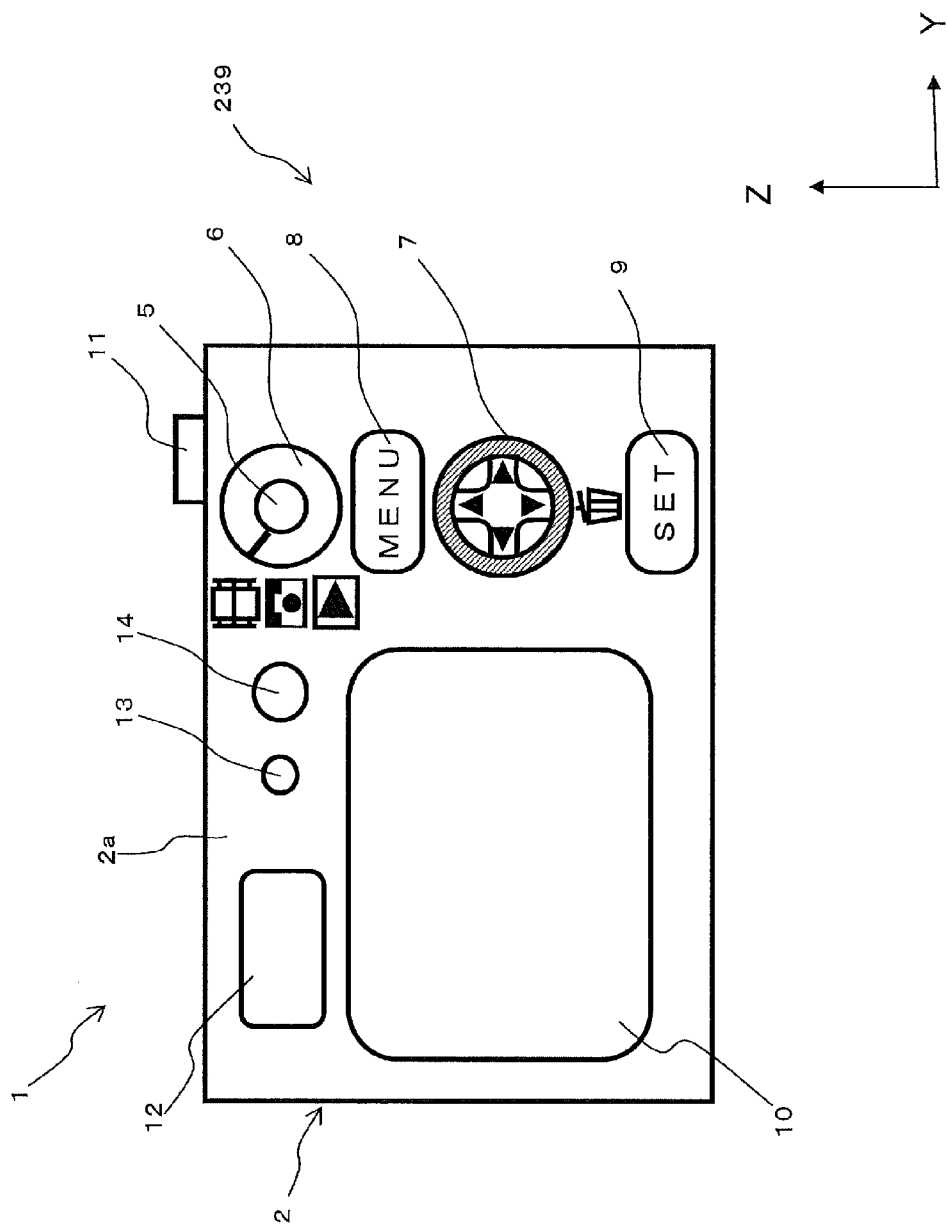
FIG. 3 is a diagram of the manipulation unit of a digital camera.

The digital camera 1 pertaining to the first embodiment will be described through reference to the drawings. FIGS. 1 and 2 are simplified oblique views of the digital camera 1. FIG. 3 is a rear view of the digital camera 1. In FIG. 1, a lens barrel 3 is mounted to a camera body 2, and in FIG. 2, the lens barrel 3 has been removed from the camera body 2.

1.1: Definition of Faces and Coordinate System

In the following description, the six sides of the digital camera 1 are defined as follows.

The side facing the subject when an image is being captured with the digital camera 1 is called the front face, and the face on opposing side is called the rear face. When an image is captured such that up and down in the vertical direction of the subject coincide with up and down in the short-side direction of the rectangular image being captured by the digital camera 1 (the aspect ratio (the ratio of long to short sides) is generally 3:2, 4:3, 16:9, etc.), the side facing upward in the vertical direction is called the top face, and the opposite side is called the bottom face. Further, when the an image is captured such that up and down in the vertical direction of the subject coincide with up and down in the short-side direction of the rectangular image being captured with the digital camera 1, the side that is on the left when viewed from the subject side is called the left face, and the opposite side is called the right face. The above definitions are not intended to limit the usage orientation of the digital camera 1.

Based on the above definitions, FIG. 1 is an oblique view illustrating the front face, top face, and right face.

The same definitions apply not only to the six sides of the digital camera 1, but also to the six sides of the various constituent members disposed in and on the digital camera 1. Specifically, the above definitions apply to the six sides of the various constituent members in the state in which they have been disposed in or on the digital camera 1.

As shown in FIGS. 1 and 2, a three-dimensional perpendicular coordinate system is defined, having a Y axis parallel to the optical axis A of an optical system O. Based on this definition, the direction facing the front face side from the rear face side along the optical axis A is called the Y axis positive side, the direction facing the left face side from the right face side and perpendicular to the optical axis A is called the X axis positive side, and the direction facing the top face side from the bottom face side and perpendicular to the X and Y axes is called the Z axis positive side.

1.2: Overall Configuration of Digital Camera

As shown in FIGS. 1 and 2, the digital camera 1 mainly comprises the camera body 2 that houses various units, the imaging optical system O that forms an optical image of a subject, and the lens barrel 3 that movably supports the imaging optical system O.

The optical system O is made up of a plurality of lens groups, and these lens groups are disposed in a state of being aligned in the Y axis direction. The lens barrel 3 is mounted, via a lens mount 20 that will be discussed below (see FIG. 5), to a body mount 4 provided to the front face of the camera body 2. The lens barrel 3 is called a single focus lens, in which the entire length is fixed and only internal lens groups are supported so as to be capable of relative movement in the Y axis direction. The configuration of the optical system O and the lens barrel 3 will be discussed in detail below.

The digital camera 1 comprises a manipulation unit 239 provided to the camera body 2. More specifically, as shown in FIG. 3, the manipulation unit 239 is constituted by a shutter button 11 provided to the top face of the camera body 2, a power switch 5 provided to the rear face of the camera body 2, a mode selector dial 6, a cross key 7, a menu setting button 8, a set button 9, a display component 10, and a viewfinder eyepiece window 12.

The shutter button 11 is used by the user to adjust the exposure timing. The power switch 5 is used by the user to turn the digital camera 1 on and off. The mode selector dial 6 is used by the user to make various settings related to imaging. The cross key 7 is used by the user to select the direction (up, down, left, or right). The menu setting button 8 is used to set various operations of the digital camera 1. The set button 9 is used to execute various menu functions. The display component 10 displays the image captured by an imaging sensor 150 (discussed below; see FIG. 14). A liquid crystal viewfinder 208 (discussed below) is disposed to the inside of the viewfinder eyepiece window 12.

The operation and manipulation method of the manipulation unit 239 will be discussed below.

2: Configuration of Optical System and Lens Barrel

Figure 4:
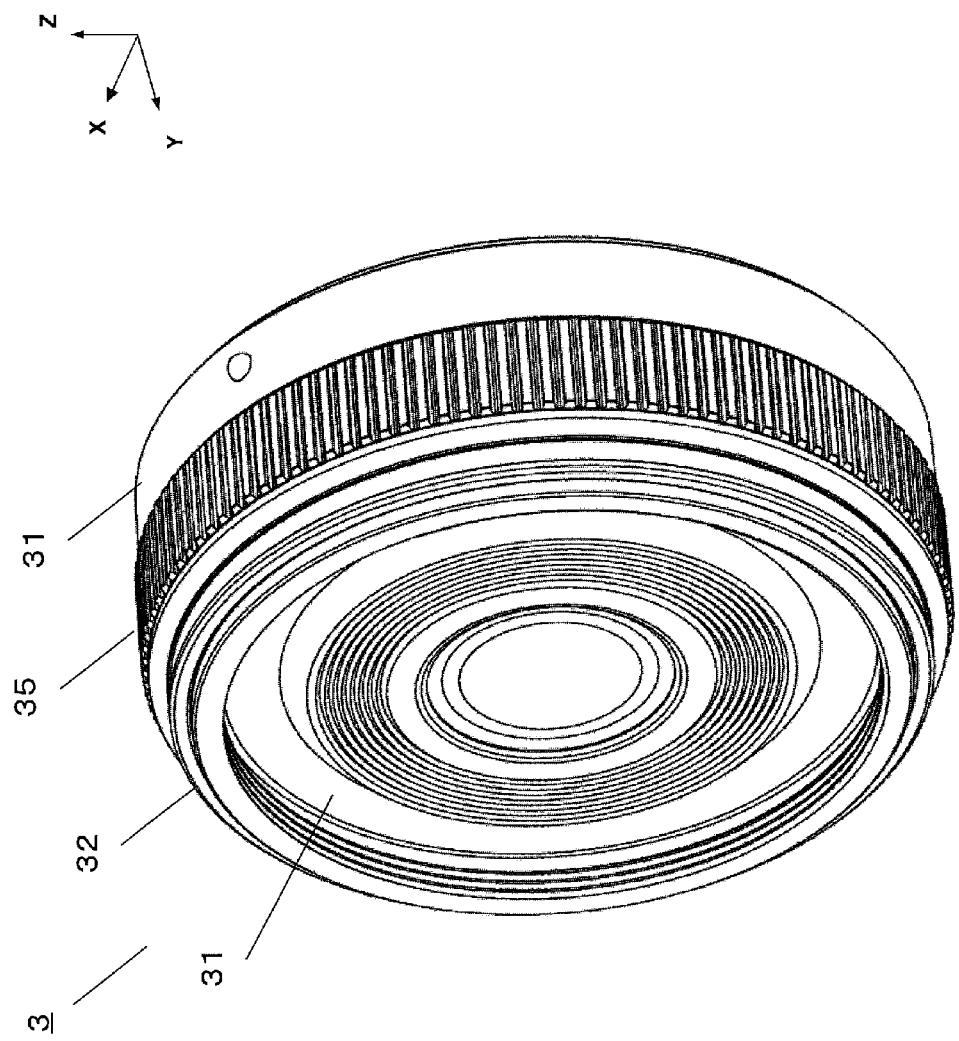
FIG. 4 is a simplified oblique view of a lens barrel.
Figure 5:
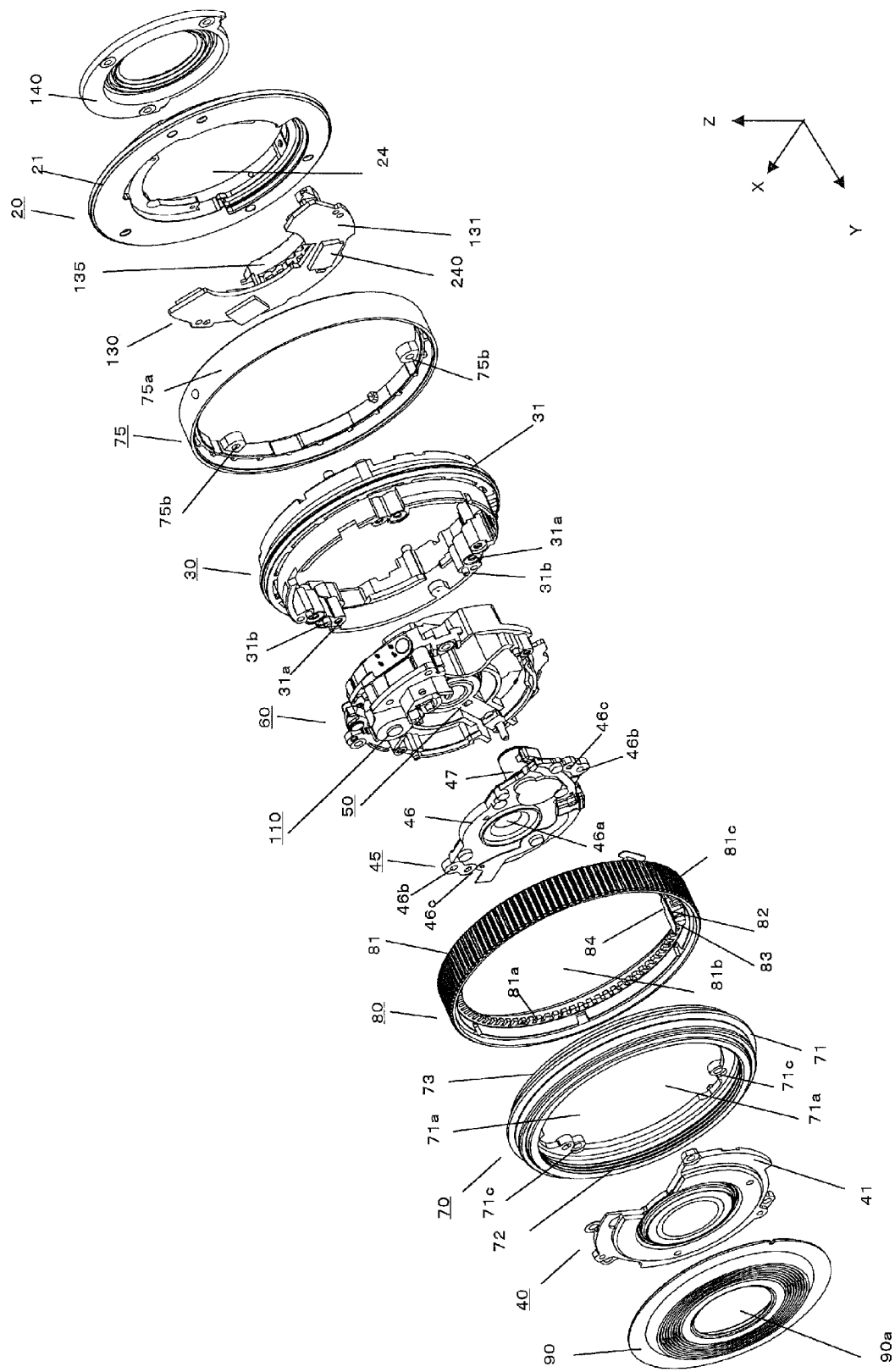
FIG. 5 is an exploded oblique view of a lens barrel.
Figure 6:
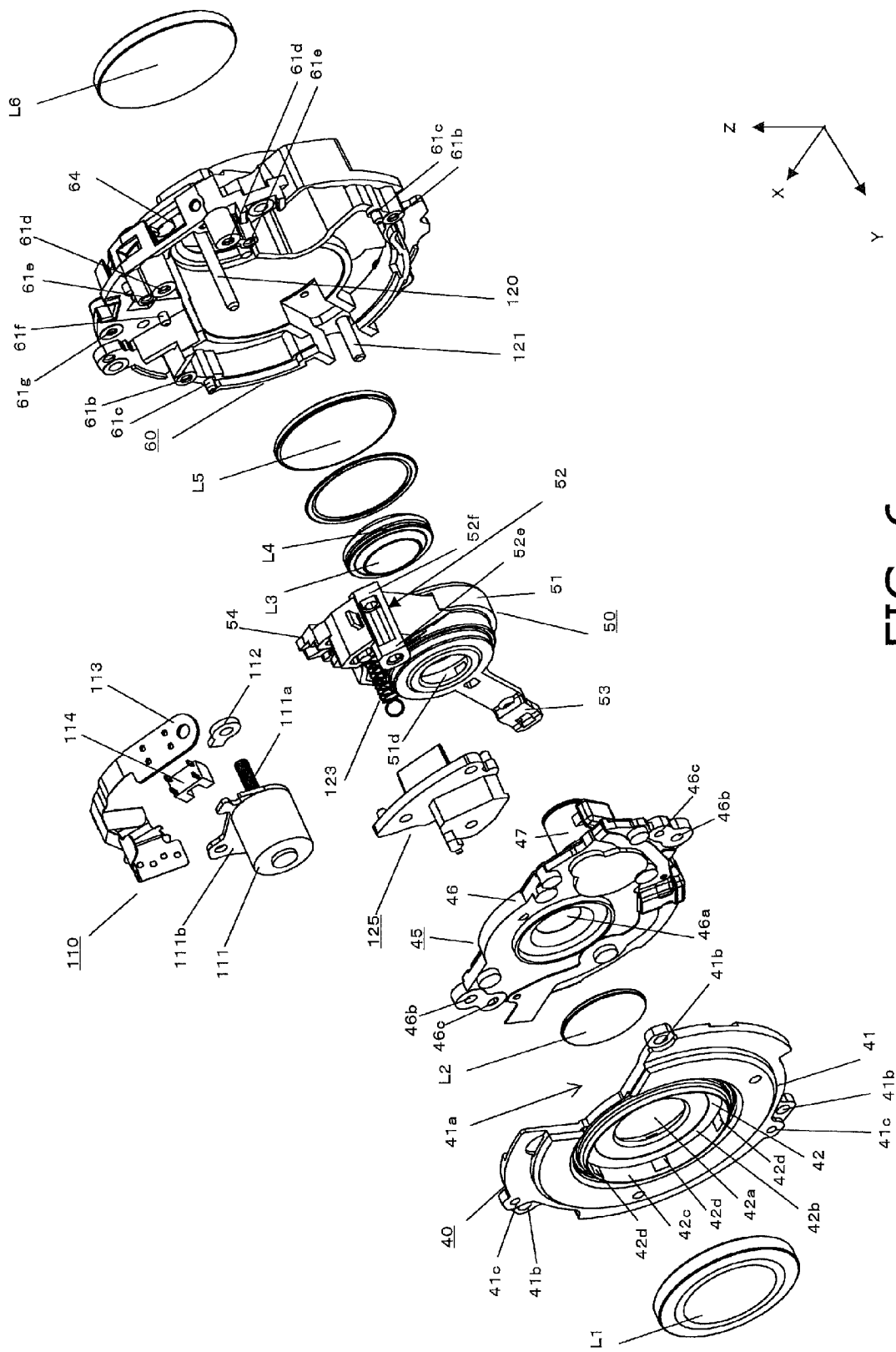
FIG. 6 is an exploded oblique view of a lens barrel.

The overall configuration of the lens barrel 3 will now be described. FIG. 4 is a simplified oblique view of the lens barrel 3, FIGS. 5 and 6 are exploded oblique views of the lens barrel 3, and FIG. 7 is a cross section of the lens barrel 3.

Figure 7:
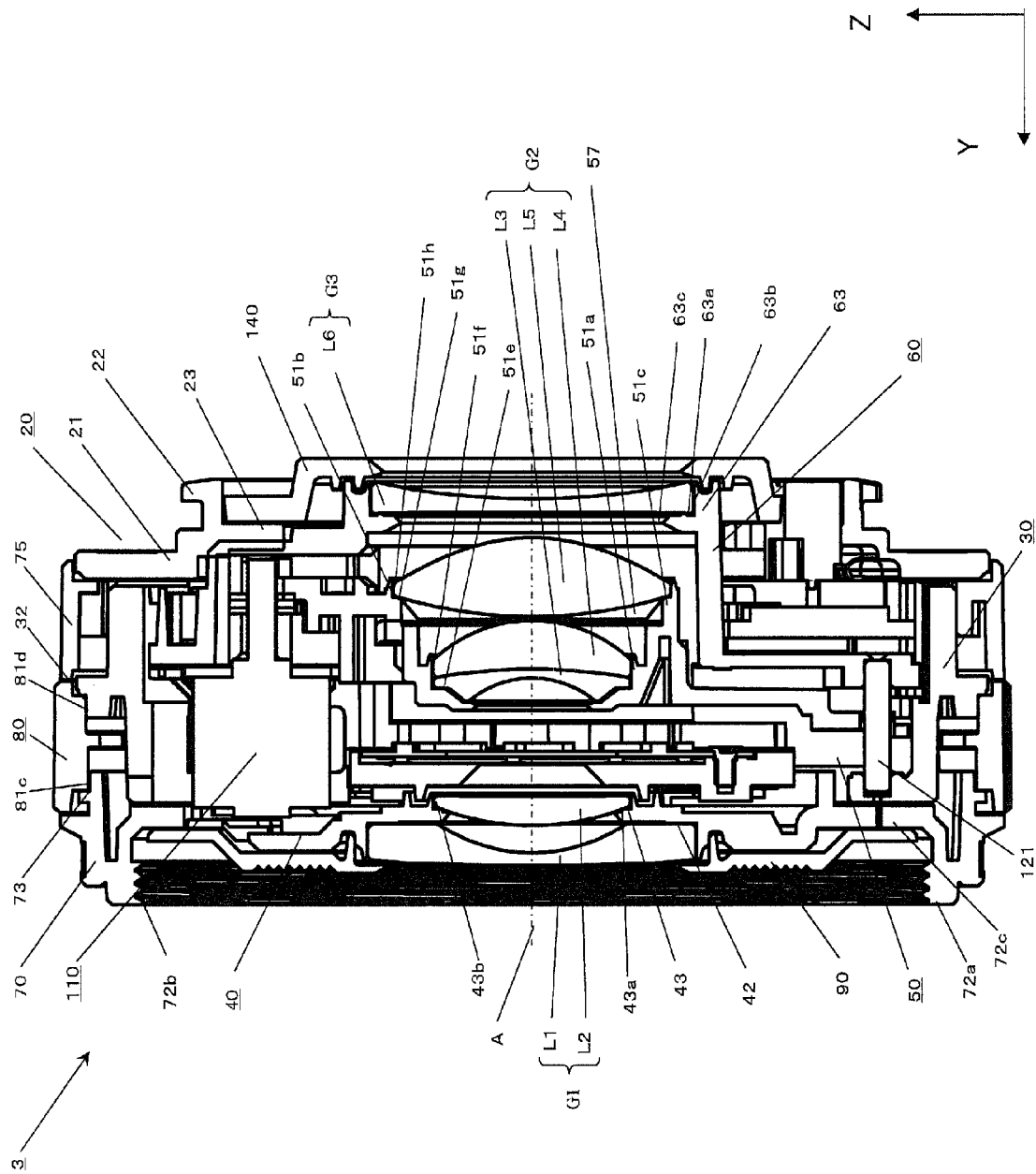
FIG. 7 is a cross section of a lens barrel.

As shown in FIG. 7, the optical system O comprises, for example, a first lens group G1 composed of a lens L1 and a lens L2, a second lens group G2 composed of a lens L3, a lens L4, and a lens L5, and a third lens group G3 composed of a lens L6. The first lens group G1 is a lens group having a positive power overall, and takes in light from the subject. The second lens group G2 is a lens group having a negative power overall, is used to adjust the focal point, for example, and is supported by the lens barrel 3 so as to be capable of relative movement in the Y axis direction. The third lens group G3 is a lens group having a negative power, for example. An aperture unit 45 is located between the first lens group G1 and the second lens group G2, and is, for example, a single focus lens with a set focal distance.

As shown in FIGS. 4 to 7, the lens barrel 3 mainly comprises the lens mount 20, a stationary frame 30, a first lens frame 40, a second lens frame 50, a third lens frame 60, and a focus motor unit 110. The lens mount 20 is removably fixed by a bayonet to the body mount 4 of the camera body 2. The stationary frame 30 is fixed to the lens mount 20. The first lens frame 40 supports the first lens group G1, which is attached to the stationary frame 30. The second lens frame 50 supports the second lens group G2, which is supported movably in the optical axis Y direction on the third lens frame 60. The third lens frame 60 supports the third lens group G3. The focus motor unit 110 is attached to the third lens frame 60 and drives the second lens frame 50 in the optical axis Y axis direction.

2.1: Stationary Frame

As shown in FIGS. 5 and 7, the stationary frame 30 is a member that attaches the optical system O to the lens mount. The optical system O and the various frames that support the optical system O are housed inside the stationary frame 30. For example, the first lens frame 40 is screwed to the stationary frame 30 (screws not shown) from the Y axis direction positive side, and the third lens frame 60 is screwed to the stationary frame 30 (screws not shown) from the Y axis direction negative side. A front frame 70 is further screwed to the stationary frame 30 from the Y axis direction positive side, and a rear frame 75 is screwed from the Y axis direction negative side. A focus ring unit 80 for manually adjusting the focus of the optical system O is attached rotatably around the optical axis A at the outer peripheral part of the front frame 70 and the rear frame 75.

2.2: First Lens Frame

As shown in FIGS. 5 to 7, the first lens frame 40 is a member used for supporting the first lens group G1. The first lens frame 40 is screwed to the third lens frame 60 from the Y axis direction positive side, and is disposed around the inner periphery of the front frame 70.

More specifically, as shown in FIG. 6, the first lens frame 40 mainly has a first lens frame main body 41, a first flange 42 to which the lens L1 is fixed, and a second flange 43 to which the lens L2 is fixed.

The first flange 42 is provided to the end of the first lens frame main body 41 on the Y axis direction positive side. The first flange 42 has a first opening 42a, a reference face 42b, a cylindrical part 42c, and a protrusion 42d. The first opening 42a passes through in the Y axis direction. The reference face 42b is used to position the lens L1 in the Y axis direction. The cylindrical part 42c is a substantially cylindrical member that is slightly larger than the outside diameter of the lens L1. The cylindrical part 42c is used to position the lens L1 in a direction perpendicular to the optical axis A. The protrusion 42d protrudes to the inner peripheral side of the cylindrical part 42c.

The second flange 43 is provided to the end of the first lens frame main body 41 on the Y axis direction negative side. The second flange 43 has a contact component 43a and a cylindrical part 43b. The contact component 43a is used to position the lens L2 in the Y axis direction. The cylindrical part 43b is used for positioning in a direction perpendicular to the optical axis A.

A cut-out 41a that passes through in the Y axis direction is formed in the outer peripheral part of the first lens frame main body 41. The cut-out 41a is formed corresponding to a shaft protection member 125 of the second lens frame 50 (discussed below).

Three screw holes 41b and two positioning holes 41c are formed in the outer peripheral part of the first lens frame main body 41. The two positioning holes 41c engage with two positioning pins 31b (see FIG. 5) of a stationary frame main body 31, pass through the three first lens frame main body 41, and are screwed tight into screw holes 31a of the stationary frame main body 31 (screws not shown). Consequently, the stationary frame 30 and the first lens frame 40 are fixed to each other in a positioned state.

2.3: Second Lens Frame 2.3.1: Summary of Second Lens Frame

As shown in FIGS. 5 to 7, the second lens frame 50 is a member used for supporting the second lens group G2 movably in the Y axis direction, and is itself supported movably in the Y axis direction by a main shaft 120 (an example of a guide shaft) and a sub-shaft 121 formed on the third lens frame 60. The drive of the second lens frame 50 is performed by the focus motor unit 110 fixed to the third lens frame 60. When the second lens frame 50 is driven by the focus motor unit 110, the second lens frame 50 moves in the Y axis direction with respect to the third lens frame 60. This allows the focus to be adjusted in the optical system O.

More specifically, as shown in FIGS. 5 to 9, the second lens frame 50 has a second lens frame main body 51, a first bearing component 52, a second bearing component 53, a drive link 54, a spring catch 55, and a protrusion 56.

The second lens frame main body 51 includes a first flange 51a, a second flange 51b, a third flange 51c, and a hole 51d that passes through in the Y axis direction.

The first flange 51a supports the lens L3 and the lens L4, which are cemented lenses. The first flange 51a is provided with a contact face 51e for positioning the lens L3 and the lens L4 in the Y axis direction, and a cylindrical part 51f for positioning the lens L3 and the lens L4 in a direction perpendicular to the optical axis A.

The second flange 51b supports the lens L5. The second flange 51b is provided with a contact face 51g for positioning the lens L5 in the Y axis direction, and a cylindrical part 51h for positioning the lens L5 in a direction perpendicular to the Y axis.

The third flange 51c is formed between the first flange 51a and the second flange 51b in the Y axis direction. The third flange 51c supports a light blocking sheet 57 for blocking any unwanted light that is incident on the lens L5. The light blocking sheet 57 is bonded to the inner peripheral face of the third flange 51c.

The first bearing component 52 is guided mainly along the main shaft 120. Consequently, the first bearing component 52 restricts the second lens group G2 from tilting with respect to the Y axis direction. The second bearing component 53 is guided along the sub-shaft 121. Consequently, the second bearing component 53 restricts the second lens frame 50 from rotating around the main shaft 120. Consequently, the second lens group G2 (the lens L3, the lens L4, and the lens L5) is restricted from tilting with respect to the Y axis direction, and is supported movably in the Y axis direction in a state of being positioned in the XZ plane.

Figure 9:
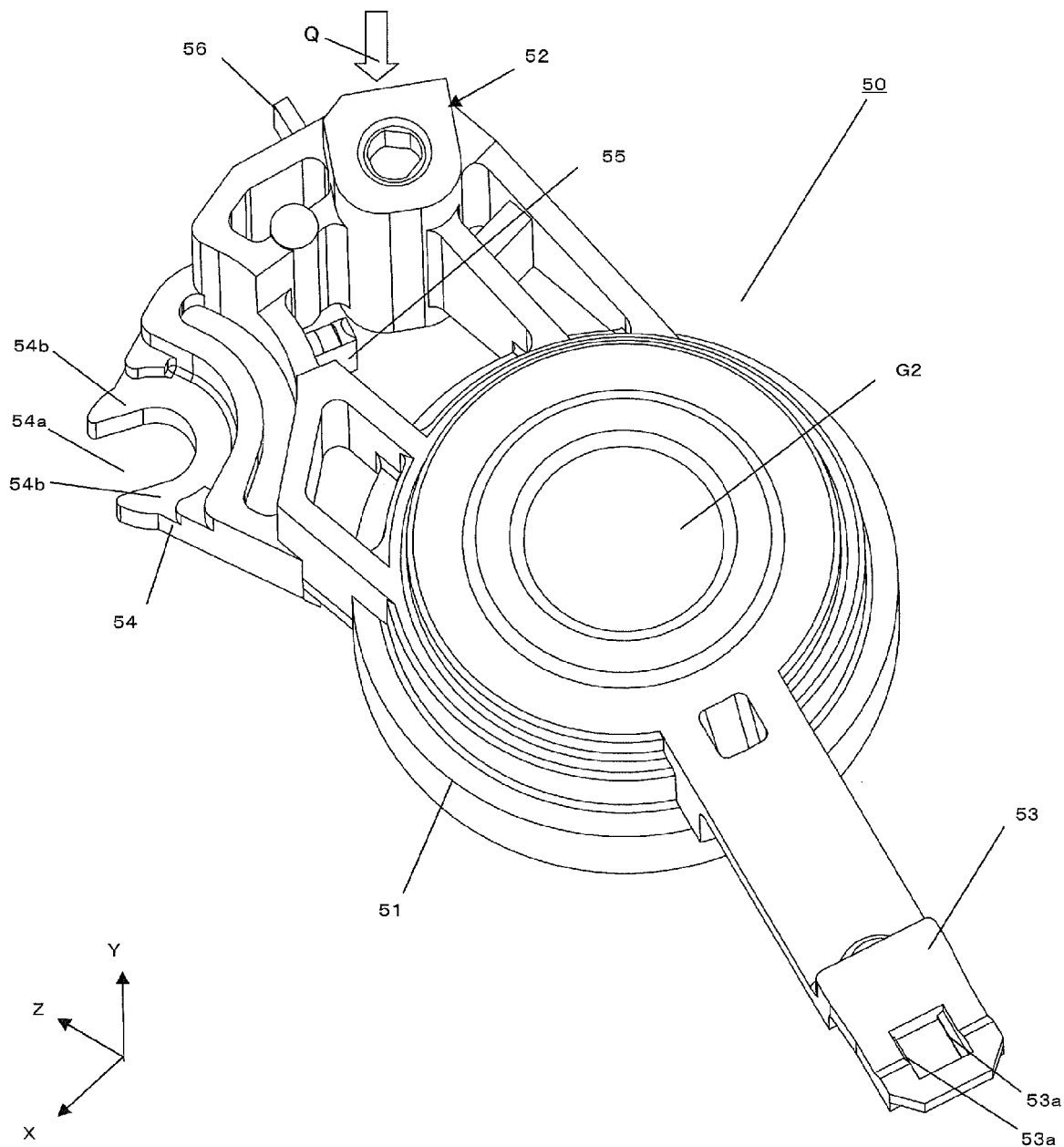
FIG. 9 is an oblique view of a second lens frame.

The drive link 54 is linked to a nut 112 of the focus motor unit 110, and drives the second lens frame 50 in the Y axis direction. As shown in FIG. 9, the drive link 54 has a cut-out 54a into which a lead screw 111a of a stepping motor 111 is inserted, and a drive face 54b that the nut 112 hits. The rotation of the lead screw 111a drives the nut 112 in the Y axis direction. This movement of the nut 112 in the Y axis direction drives the second lens frame 50 in the Y axis direction via the drive link 54. The nut 112 is disposed on the Y axis direction positive side of the drive link 54, and when the nut 112 is moved to the Y axis direction negative side by the rotation of the lead screw 111a, the nut 112 drives the drive face 54b of the drive link 54 to the Y axis direction negative side. Also, when the nut 112 moves to the Y axis direction positive side, the second lens frame 50 is driven to the Y axis direction positive side in a state in which the drive face 54b is pushed against the nut 112 by the biasing force to the Y axis direction positive side of the second lens frame 50 by a tension spring 123.

The spring catch 55 is used to attach the tension spring 123, which biases the second lens frame 50 to the Y axis direction positive side. The spring catch 55 is disposed between the first bearing component 52 and the drive link 54. Therefore, the tension spring 123 is disposed between the lead screw 111a and the main shaft 120 (see FIG. 12). The second lens frame 50 is constantly biased to the Y axis direction positive side by the tension spring 123.

The protrusion 56 is used by a photointerrupter 114 to detect the position of the second lens frame 50 in the Y axis direction.

2.3.2.: Detailed Configuration of First Bearing Component 52

Figure 10:
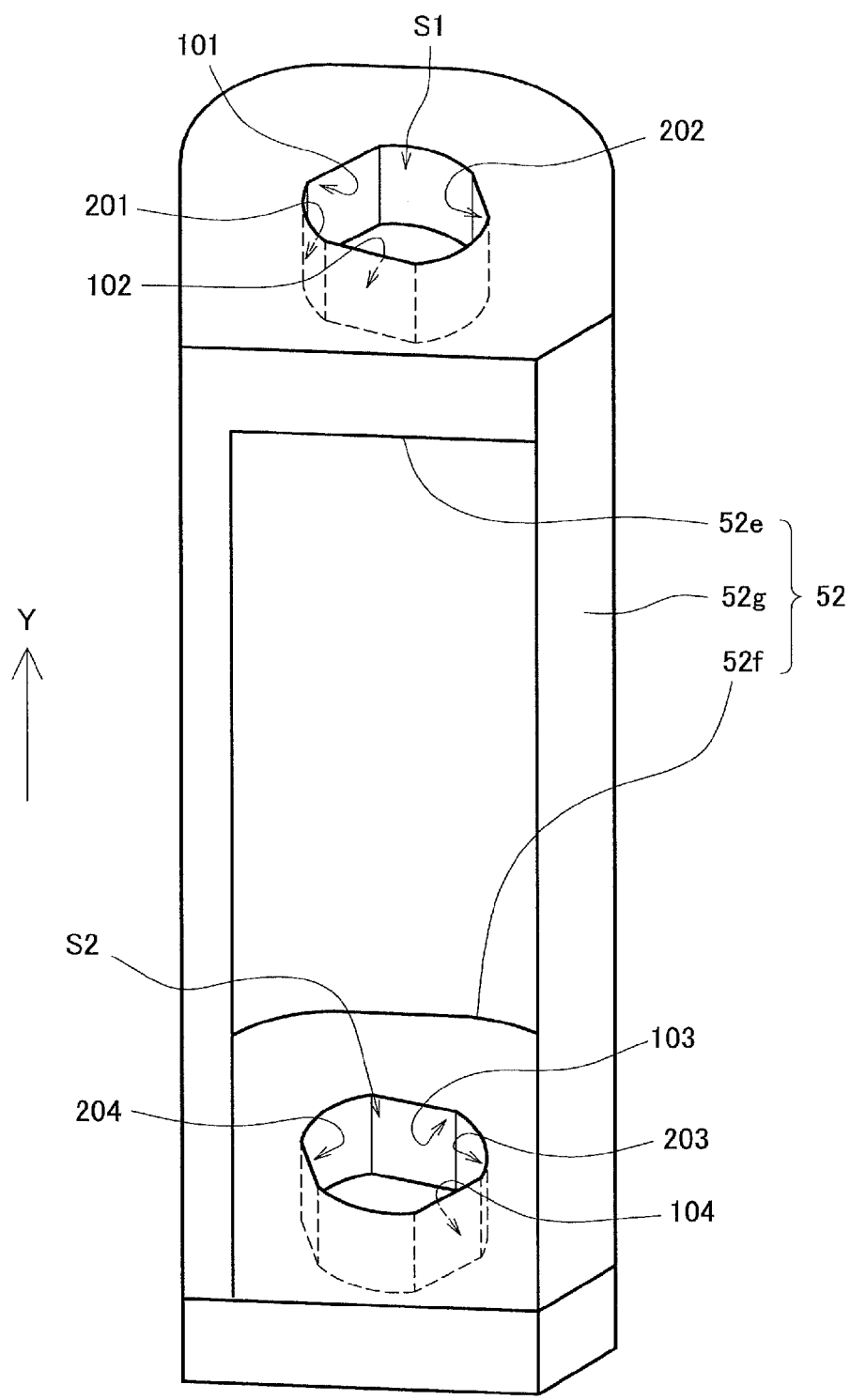
FIG. 10 is an oblique view of a first bearing component as seen from the arrow Q in FIG. 9.
Figure 11:
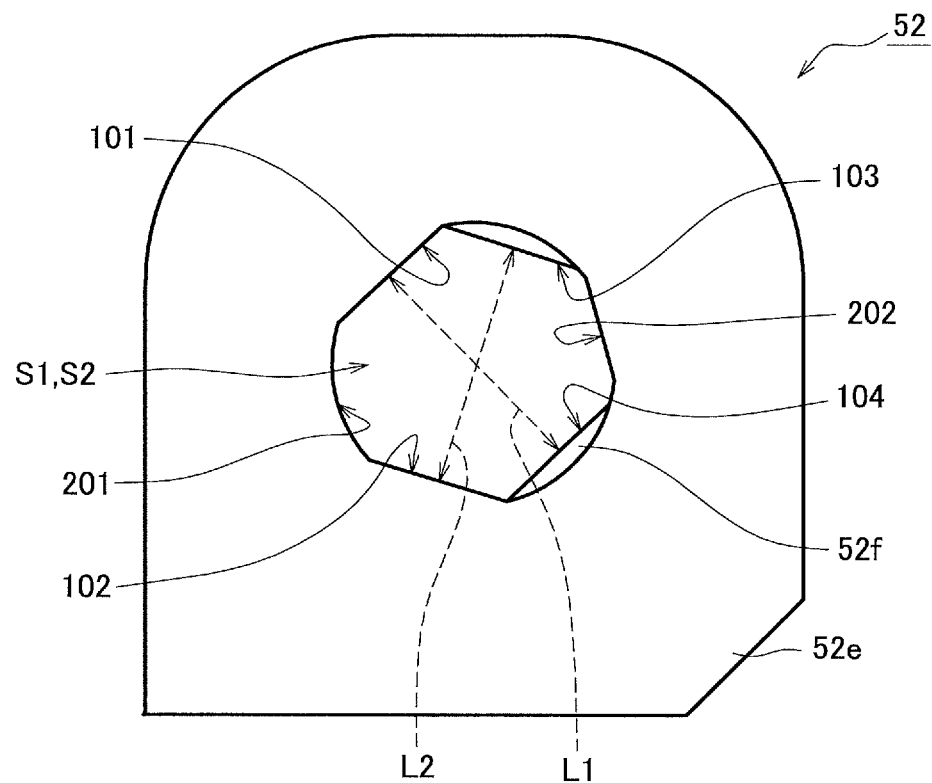
FIG. 11 is a plan view of a first bearing component.

Next, the detailed configuration of the first bearing component 52 will be described through reference to the drawings. FIG. 10 is an oblique view of the first bearing component 52 as seen from the arrow Q in FIG. 9. FIG. 11 is a plan view of the first bearing component 52 as seen from the subject side.

As shown in FIG. 10, the first bearing component 52 is constituted by an upper bearing component 52e (an example of a first bearing component), a lower bearing component 52f (an example of a second bearing component), and a linking component 52g.

The upper bearing component 52e is a flat member disposed along the XZ plane. An upper insertion hole S1 (an example of a first insertion hole) is formed in the Y axis direction in the center of the upper bearing component 52e. The upper insertion hole S1 is used to insert the main shaft 120 of the third lens frame 60. A first flat face 101, a second flat face 102, a first communicating face 201, and a second communicating face 202 are formed around the inner periphery of the upper insertion hole S1.

The first flat face 101 is formed perpendicular to the XZ plane. The first flat face 101 is formed in a rectangular shape in plan view. The second flat face 102 is also formed perpendicular to the XZ plane. The second flat face 102 is also formed in a rectangular shape in plan view. In this embodiment, the second flat face 102 forms an acute angle to the first flat face 101, and is disposed diagonally opposite the first flat face 101.

The first communicating face 201 is a curved face formed perpendicular to the XZ plane. The first communicating face 201 communicates between the first flat face 101 and the second flat face 102. The second communicating face 202 is also a curved face formed perpendicular to the XZ plane. The second communicating face 202 also communicates between the first flat face 101 and the second flat face 102. The second communicating face 202 is disposed opposite the first communicating face 201. The surface area of the second communicating face 202 is greater than the surface area of the first communicating face 201.

The lower bearing component 52f is a flat member disposed parallel to the upper bearing component 52e. A lower insertion hole S2 (an example of a second insertion hole) is formed in the Y axis direction in the center of the lower bearing component 52f. The lower insertion hole S2 is used to insert the main shaft 120 of the third lens frame 60. A third flat face 103, a fourth flat face 104, a third communication face 203, and a fourth communication face 204 are formed around the inner periphery of the lower insertion hole S2.

As shown in FIG. 11, part of the lower insertion hole S2 and part of the upper insertion hole S1 overlap each other in plan view. Also, as shown in FIG. 11, the third flat face 103 and the fourth flat face 104 of the lower bearing component 52f are positioned inside the upper insertion hole S1 in plan view.

The third flat face 103 is formed perpendicular to the XZ plane. The third flat face 103 is formed in a rectangular shape in plan view. The fourth flat face 104 is also formed perpendicular to the XZ plane. The fourth flat face 104 is also formed in a rectangular shape in plan view. In this embodiment, the fourth flat face 104 forms an acute angle to the third flat face 103, and is disposed diagonally opposite the third flat face 103.

The third communication face 203 is a curved face formed perpendicular to the XZ plane. The third communication face 203 communicates between the third flat face 103 and the fourth flat face 104. The fourth communication face 204 is also a curved face formed perpendicular to the XZ plane. The fourth communication face 204 also communicates between the third flat face 103 and the fourth flat face 104. The fourth communication face 204 is disposed opposite the third communication face 203. The surface area of the fourth communication face 204 is greater than the surface area of the third communication face 203.

Here, as shown in FIG. 11, the first flat face 101 and the fourth flat face 104 are substantially parallel to each other, and the second flat face 102 and the third flat face 103 are substantially parallel to each other. The distance L1 between the first flat face 101 and the fourth flat face 104 is equal to the distance L2 between the second flat face 102 and the third flat face 103. Furthermore, the first flat face 101, the second flat face 102, the third flat face 103, and the fourth flat face 104 each form a linear shape in plan view from the subject side (see FIG. 11).

The linking component 52g is formed in the Y axis direction. The linking component 52g links the upper bearing component 52e and the lower bearing component 52f.

2.3.3: Assembly State of Second Lens Frame 50 and Third Lens Frame 60

Next, the assembly state of the second lens frame 50 and the third lens frame 60 will be described through reference to the drawings. In the following, particular emphasis will be placed on the contact state between the second bearing component 53 of the second lens frame 50 and the main shaft 120 of the third lens frame 60.

Figure 12:
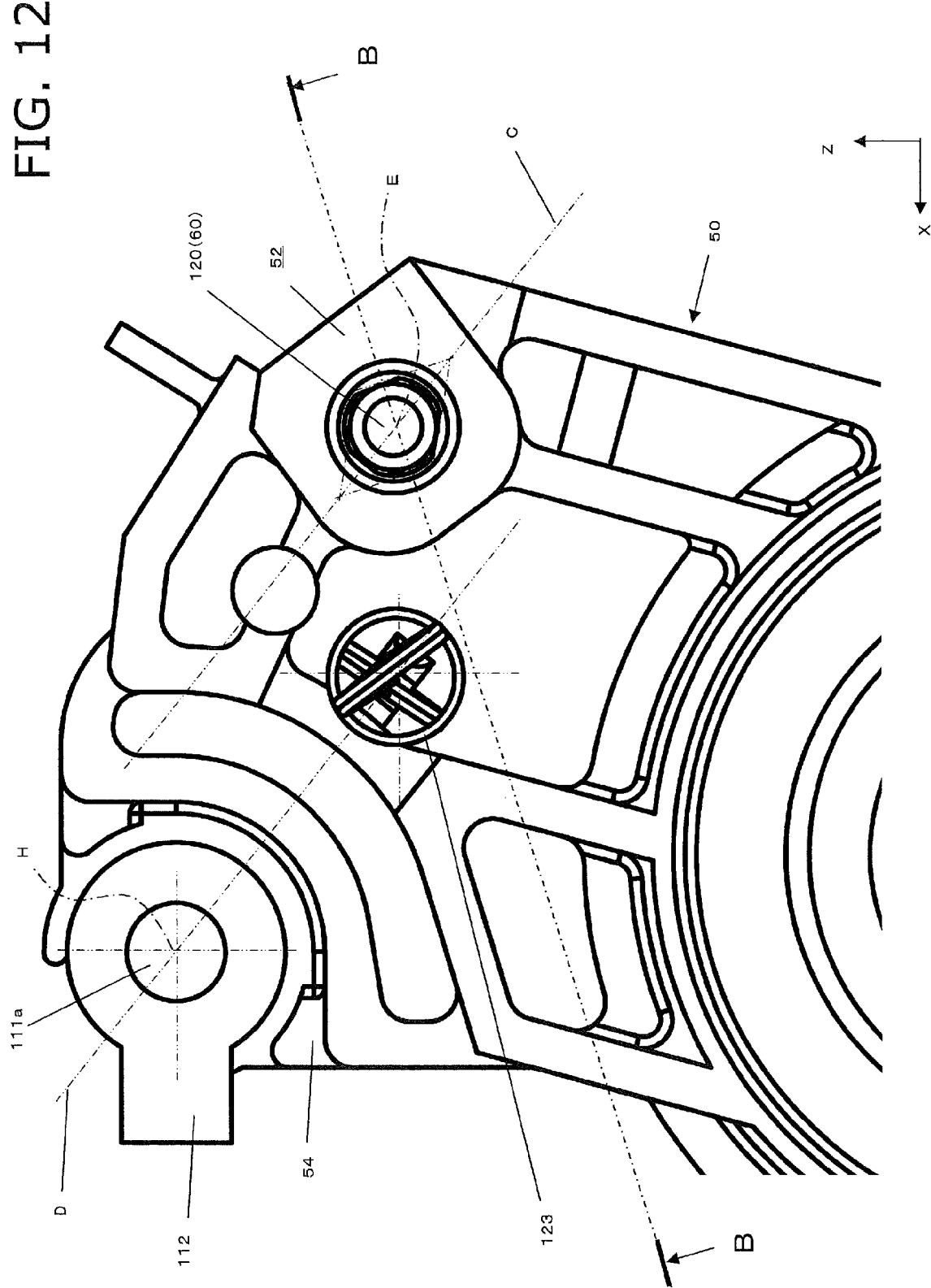
FIG. 12 is a partial plan view of a second lens frame.
Figure 13:
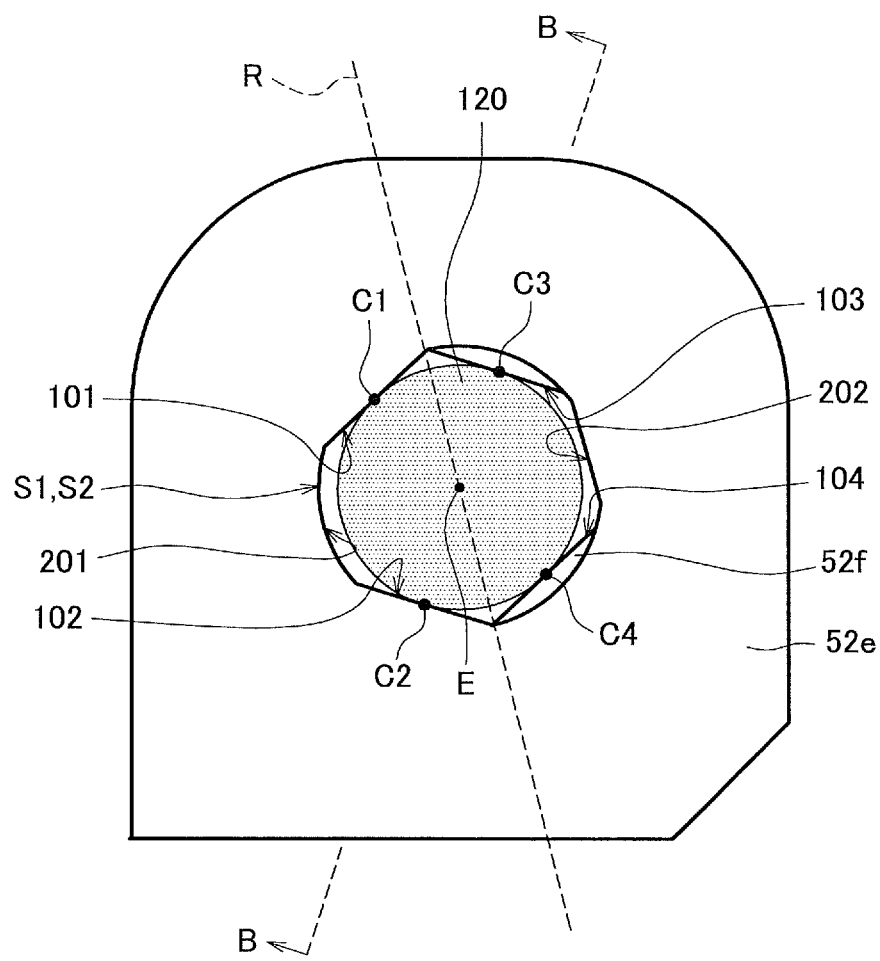
FIG. 13 is a detail enlargement of FIG. 12.
Figure 14:
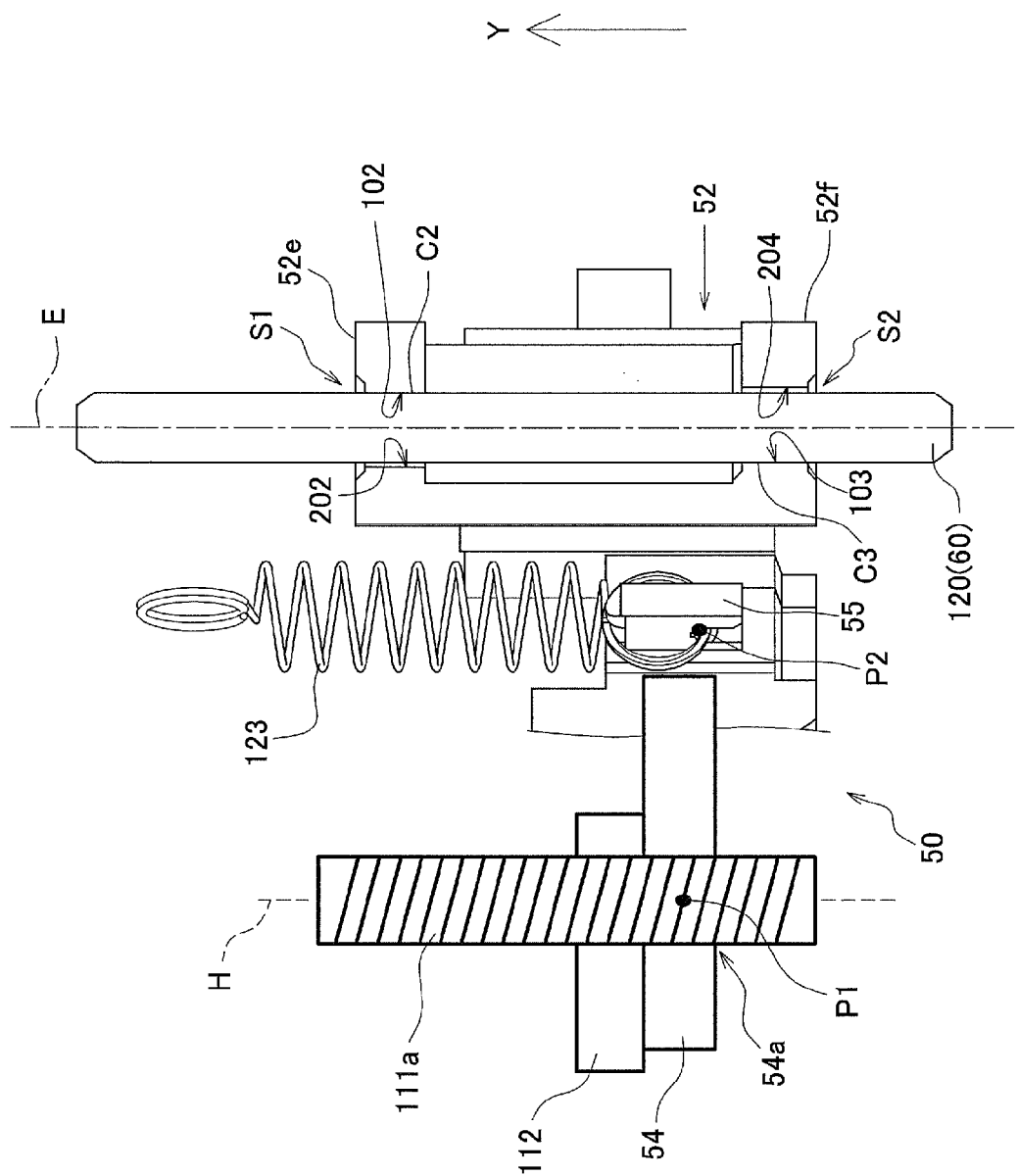
FIG. 14 is a cross section of a second lens frame.

FIG. 12 is a partial plan view of the second lens frame 50 attached to the third lens frame 60, as seen from the subject side. FIG. 13 is a detail enlargement of FIG. 12. FIG. 14 is a cross section along the B-B line in FIGS. 12 and 13.

As shown in FIG. 12, the main shaft 120 of the third lens frame 60 is inserted into the second bearing component 53 of the second lens frame 50. More specifically, as shown in FIGS. 13 and 14, the main shaft 120 is inserted into the upper insertion hole S1 of the upper bearing component 52e and the lower insertion hole S2 of the lower bearing component 52f.

As shown in FIGS. 13 and 14, the main shaft 120 hits the first flat face 101 at a first contact point c1 within the upper insertion hole S1. The main shaft 120 hits the second flat face 102 at a second contact point c2 within the upper insertion hole S1. The main shaft 120 hits the third flat face 103 at a third contact point c3 within the lower insertion hole S2. The main shaft 120 hits the fourth flat face 104 at a fourth contact point c4 within the lower insertion hole S2. As shown in FIG. 13, the first contact point c1 and the second contact point c2 are in point symmetry with the third contact point c3 and the fourth contact point c4 around the guide axis E of the main shaft 120. Also, as shown in FIG. 14, the first contact point c1 and the second contact point c2 are located more to the subject side than the third contact point c3 and the fourth contact point c4.

As shown in FIGS. 13 and 14, the main shaft 120 is apart from the first communicating face 201 and the second communicating face 202 within the upper insertion hole S1. Similarly, the main shaft 120 is apart from the third communication face 203 and the fourth communication face 204 within the lower insertion hole S2.

As shown in FIGS. 12 and 14, the first contact point c1 and the second contact point c2 are farther away from a lead screw axis H of the lead screw 111a of the stepping motor 111 than the third contact point c3 and the fourth contact point c4. Also, as shown in FIG. 13, the first contact point c1 and the second contact point c2 pass through the guide axis E of the main shaft 120 and are located on opposing side from the third contact point c3 and the fourth contact point c4 using as a reference a parallel face R that is parallel to the Y axis direction. The first contact point c1 and the second contact point c2 are farther away from the lead screw axis H than the parallel face R, and the third contact point c3 and the fourth contact point c4 are closer to the lead screw axis H than the parallel face R. However, the parallel face R may be any face that passes through the guide axis E, and may be a curved surface.

As discussed above, the main shaft 120 hits the upper bearing component 52e only at the first contact point c1 and the second contact point c2, and hits the lower bearing component 52f only at the third contact point c3 and the fourth contact point c4. Consequently, the first bearing component 52 is restricted from rotating to the Y axis direction positive side around a first center point P1 of the cut-out 54a formed in the drive link 54, by the biasing force applied to a latching point P2 between the spring catch 55 and the tension spring 123.

Since the first flat face 101, the second flat face 102, the third flat face 103, and the fourth flat face 104 each extend in the Y axis direction, the first contact point c1, the second contact point c2, the third contact point c3, and the fourth contact point c4 each extend linearly in the Y axis direction (only the second contact point c2 and the third contact point c3 are shown in FIG. 14).

2.3.4: Relation of Force Exerted on First Bearing Component 52

Figure 15:
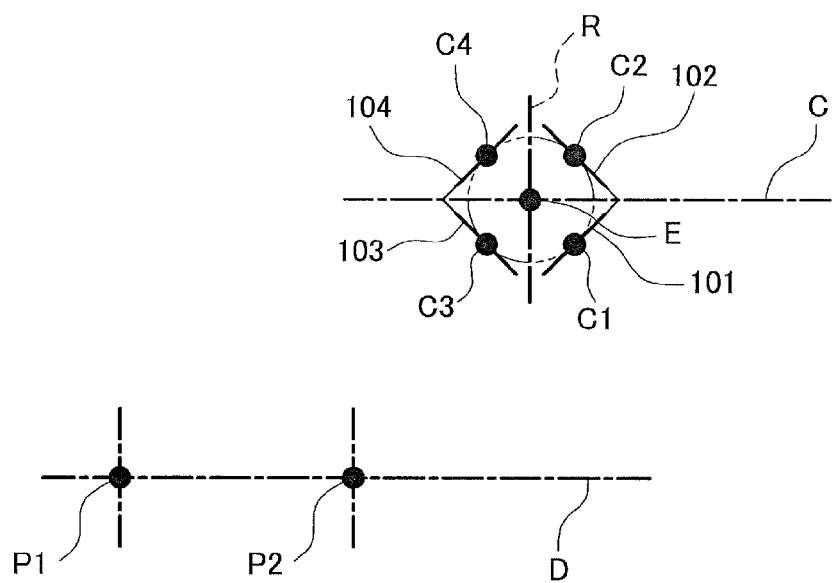
FIG. 15 is a plan view illustrating the second lens frame biasing force.

FIG. 15 is a simplified diagram of the first contact point c1, the second contact point c2, the third contact point c3, the fourth contact point c4, the drive action point P1 of the second lens frame 50 (the same as the first center point P1 shown in FIG. 14), and the spring action point P2 (the same as the latching point P2 shown in FIG. 14), as seen from the Y axis direction positive side.

As shown in FIG. 15, an imaginary line C that connects the intersection point between the first flat face 101 and the second flat face 102 with the intersection point between the third flat face 103 and the fourth flat face 104 is substantially parallel to an imaginary line D that connects the drive action point P1 with the spring action point P2. Also, the imaginary line C passes through the middle point between the first contact point c1 and the second contact point c2, and the middle point between the third contact point c3 and the fourth contact point c4.

Figure 16:
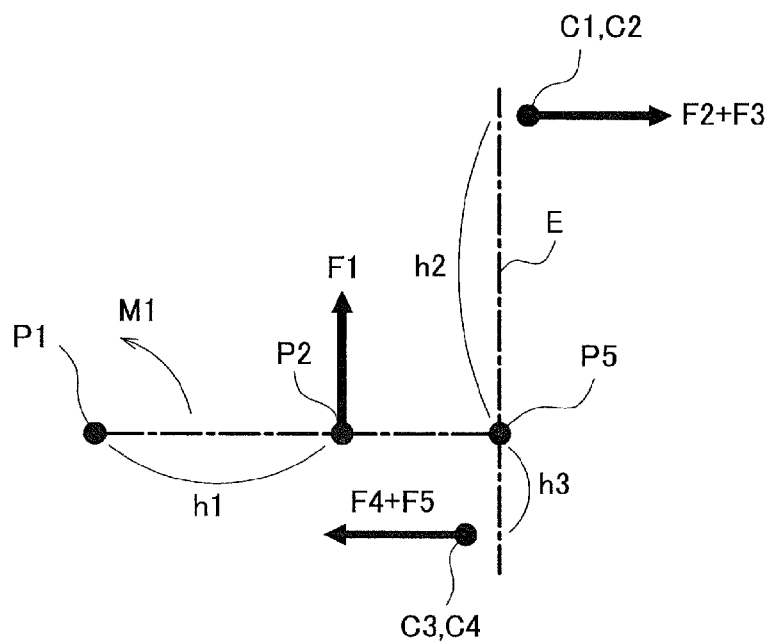
FIG. 16 is a plan side view illustrating the second lens frame biasing force.

FIG. 16 is a simplified diagram of the equilibrium in force exerted on the second lens frame 50 when viewed in a direction perpendicular to the plane that includes the imaginary line C and the guide axis E (two straight lines).

As shown in FIG. 16, a moment M1, which rotates counterclockwise around the drive action point P1, is caused to act on the second lens frame 50 by the biasing force F1 of the tension spring 123. Reaction forces F2 and F3 from the main shaft 120 act respectively on the first contact point c1 and the second contact point c2 of the main shaft 120 of the upper bearing component 52e so as to balance this moment M1. Also, reaction forces F4 and F5 from the main shaft 120 act respectively on the third contact point c3 and the fourth contact point c4 of the main shaft 120 of the lower bearing component 52f. Thus, to balance the moment M1, the reaction forces F2 and F3 from the main shaft 120 to the upper bearing component 52e, and the reaction forces F4 and F5 from the main shaft 120 to the lower bearing component 52f are in mutually opposite directions. Therefore, the first contact point c1 and the second contact point c2, and the third contact point c3 and the fourth contact point c4 are substantially in point symmetry with respect to the second center point P5 of the main shaft, which allows the reaction forces F2, F3, F4, and F5 that balance the moment M1 to be received stably by the first bearing component 52. Consequently, the orientation of the second lens frame 50 can be stably maintained.

As shown in FIG. 15, having the imaginary line C and the imaginary line D be substantially parallel allows the reaction forces F2 and F3 exerted on the first contact point c1 and the second contact point c2, and the reaction forces F4 and F5 exerted on the third contact point c3 and the fourth contact point c4 to act uniformly on the first bearing component 52, so the orientation of the second lens frame 50 can be stabilized.

2.4: Third Lens Frame

As shown in FIGS. 5 to 8, the third lens frame 60 is a member for supporting the lens L6, and is attached to the stationary frame 30. The second lens frame 50 is attached movably in the Y axis direction to the third lens frame 60, and the aperture unit 45 is screwed to the third lens frame 60 on the Y axis direction positive side of the second lens frame 50.

More specifically, the third lens frame 60 is provided with a third lens frame main body 61, a flange 63 for inserting and supporting the lens L6 from the Y axis direction negative side, three screw holes 61a for screwing to the stationary frame 30, and the main shaft 120 and sub-shaft 121 that are press-fitted into the third lens frame main body 61.

A lens L6 placement face 63a for positioning the lens L6 in the Y axis direction, a cylinder 63b for positioning in a direction perpendicular to the Y axis, and a through-hole 63c that passes through in the Y axis direction are formed in the flange 63.

Figure 8:
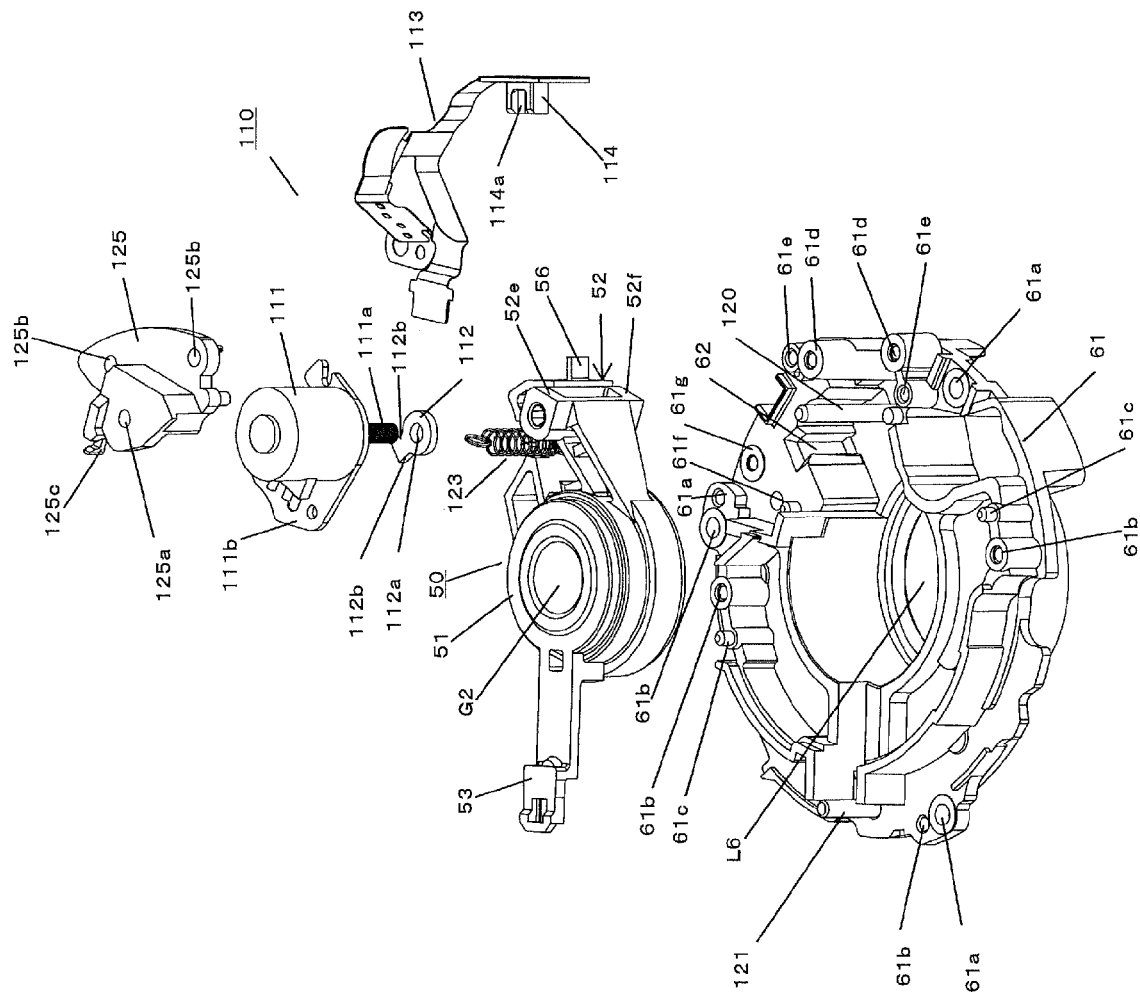
FIG. 8 is an exploded oblique view of a lens barrel.

As shown in FIG. 8, a restricting groove 62 that restricts the rotation of the nut 112 around the lead screw 111a and guides a protrusion 112b of the nut 112 is formed near the main shaft 120. Also, two screw holes 61b for screwing down the aperture unit 45, a positioning pin 61c for positioning the aperture unit 45 with respect to the third lens frame 60, two screw holes 61d for screwing down the shaft protection member 125 that supports the end of the main shaft 120 on the Y axis direction positive side, and two positioning holes 61e for positioning the shaft protection member 125 with respect to the third lens frame 60 are formed at the end of the third lens frame 60 on the Y axis direction positive side. Further, a positioning pin 61f of the focus motor unit 110, a screw hole 61g for fixing the focus motor unit 110, and an attachment hole 64 of the photointerrupter 114 are provided to the third lens frame main body 61.

The shaft protection member 125 has a shaft hole 125a into which the main shaft 120 is inserted, a screw hole 125b for screwing the shaft protection member 125 to the third lens frame 60, and a spring catch 125c for attaching the tension spring 123 that biases the second lens frame 50 to the Y axis direction positive side.

2.5: Aperture Adjusting Unit

As shown in FIGS. 5 and 6, the aperture unit 45 has an aperture main body 46, an aperture vane 48, and an aperture drive motor 47 for driving the aperture vane 48. The aperture drive motor 47 is stepping motor, for example. An opening hole 46a that passes through in the Y axis direction, two screw holes 46b for screwing to the third lens frame 60, and two positioning holes 46c are formed in the aperture main body 46. The aperture vane 48 is driven in its opening and closing directions by the drive force generated by the aperture drive motor 47, and thereby changes the opening shape. The aperture value of the optical system L can be varied by driving the aperture vane 48.

2.6: Focus Motor Unit

As shown in FIG. 8, the focus motor unit 110 consists of the focus motor 111, an attachment plate 111b for fixing the focus motor 111 to the third lens frame 60, the lead screw 111a (in which male threads are formed), the nut 112, an FPC (flexible printed circuit) 113 for sending drive signals to the focus motor 111, and the photointerrupter 114 that detects the home position of the second lens frame 50. The nut 112 has female threads formed in its center, and meshes with the lead screw 111a. Further, a protrusion 62b that is restricted by the restricting groove 62 of the third lens frame 60 is formed on the nut 112.

2.7: Focus Ring Unit

As shown in FIGS. 5 and 7, the focus ring unit 80 uses two photointerrupters 82 and 83 to detect the amount of rotation of a substantially cylindrical focus ring main body 81.

More specifically, knurling 81c is formed around the outer peripheral part of the focus ring main body 81, and numerous tooth-like protrusions 81a provided in the peripheral direction, and a through-hole 81b that passes through in the Y axis direction are formed in the inner peripheral part of the focus ring main body 81. Signals are outputted from the photointerrupters 82 and 83 according to the rotation of the focus ring main body 81 when the focus ring main body 81 is turned by the photointerrupters 82 and 83, which are disposed so as sandwich the tooth-like protrusions 81a between a light emitter (not shown) and a light receiver (not shown). Consequently, signals flow from an FPC (flexible printed circuit) 84 electrically connected to the photointerrupters 82 and 83, to an electrical board 130.

The focus ring main body 81 has guide faces 81c and 81d that are guided by a slider 73 of the front frame 70 and a slider 32 of the stationary frame 30, respectively. The focus ring main body 81 is supported rotatably around the optical axis A with respect to the stationary frame 30. The rotation detection signals for the focus ring main body 81 outputted by the photointerrupters 82 and 83 go through the FPC (flexible printed circuit) 84 and are processed by the circuit board 130 so as to drive the focus motor 110.

2.8: Front Frame

As shown in FIGS. 5 and 7, the front frame 70 comprises a front frame main body 71, a filter attachment component 72 provided to the end on the Y axis direction positive side, and the slider 73 that rotatably supports the focus ring 80 of the outer peripheral part of the end on the Y axis direction negative side.

The front frame main body 71 comprises a through-hole 71b that passes through in the Y axis direction, and three screw holes 71c that are screwed to the stationary frame 30.

The filter attachment component 72 comprises an end face 72a for positioning a filter (not shown) in the Y axis direction negative side direction, a female thread 72b for attaching the filter, and a bonding face 72c for bonding a front cover 90.

2.9: Lens Mount

As shown in FIGS. 5 and 7, the lens mount 20 is a member used for attaching the lens barrel 3 to the camera body 2. More specifically, the lens mount 20 has a through-hole 24 that passes through in the Y axis direction, a flange 21 for screwing down to the lens barrel 3 (screws not shown), a bayonet 22 for attaching to a body mount (not shown) provided to the front face of the camera body 2, and a light blocking frame attachment component 23 for screwing on a light blocking frame 140 from the Y axis direction negative side (threads not shown).

2.10: Front Cover

As shown in FIGS. 5 and 7, the front cover 90 is bonded and fixed by double-sided tape (not shown), for example, to the bonding face 72c of the front frame 70. Consequently, light rays that are not wanted on the lens L1 are blocked, and this also prevents infiltration by dirt, etc., into the interior of the lens barrel 3 by covering parts such as the shaft protection member 125, and screws (not shown) for fixing the first lens frame 40 to the stationary frame 30.

2.11: Rear Frame

The rear frame 75 is a member that forms part of the outer shell of the lens barrel 3, and comprises an outer shell part 75a and a screw hole 75b for screwing to the stationary frame 30 from the Y axis direction negative side.

2.12: Circuit Board

As shown in FIGS. 5 and 7, the circuit board 130 is a part that mainly performs communication processing with the camera body 2, and drive control of the stepping motor 111 and the aperture unit 45 of the lens barrel 3.

The circuit board 130 is constituted, for example, by a lens microprocessor 240, a plurality of electrical parts (not shown), a contact part 135 that performs power supply connection and signal communication with the camera body 2, and an FPC (not shown) that connects the contact part 135 to a board main body 131.

2.13: Camera Body

The main structure of the camera body 2 will be described through reference to FIGS. 1, 2, 3, 17, and 18.

2.13.1: Manipulation Unit

The mode selector dial 6 is used to switch between still picture imaging mode, moving picture imaging mode, reproduction mode, and other such operating modes. The user can switch the operating mode by turning the mode selector dial 6. When the still picture imaging mode is selected with the mode selector dial 6, the operating mode can be switched to still picture imaging mode, and when the moving picture imaging mode is selected with the mode selector dial 6, the operating mode can be switched to moving picture imaging mode. In moving picture imaging mode, basically moving picture imaging is possible. Furthermore, when the reproduction mode is selected with the mode selector dial 6, the operating mode can be switched to reproduction mode, and the captured image can be displayed on the display component 10.

The cross key 7 is a button the user can use to select the up, down, left, or right direction. The cross key 7 can be used, for example, to select the desired menu from among various menu screens displayed on the display component 10.

The menu setting button 8 is used for setting the various operations of the digital camera 1. The set button 9 is used for executing the functions of the various menus.

A moving picture imaging button 14 is used to start or stop moving picture imaging. Even if the operating mode selected with the mode selector dial 6 is the still picture imaging mode or the reproduction mode, when this moving picture imaging button 14 is pressed, the operating mode is forcibly changed to the moving picture imaging mode and moving picture imaging is started regardless of the setting on the mode selector dial 6. Further, if this moving picture imaging button 14 is pressed during moving picture imaging, the moving picture imaging is ended, and the operating mode changes to the one selected on the mode selector dial 6, that is, to the one prior to the start of moving picture imaging. For example, if the still picture imaging mode has been selected with the mode selector dial 6 when the moving picture imaging button 14 is pressed, the operating mode will automatically change back to the still picture imaging mode after the moving picture imaging button 14 has been pressed again.

The shutter button 11 is operated by the user during imaging. When the shutter button 11 is operated, a timing signal is outputted to a body microprocessor 210. The shutter button 11 is a two-stage switch that can be pressed half-way or all the way down. Light metering and ranging are commenced when the user presses this button half-way down. If the user presses the shutter button 11 all the way down in a state in which the shutter button 11 has been pressed half-way down, a timing signal is outputted, and image data is acquired by an image acquisition component 235.

Furthermore, a lens attachment/removal button 99 (an example of a lens attachment/removal manipulation component, and an example of a spare operation detector) for attaching and removing the lens barrel 3 to and from the camera body 2 is provided on the front face of the camera body 2. The lens attachment/removal button 99 has a contact (not shown) that is ON when pressed by the user, for example, and is electrically connected to the body microprocessor 210. When the lens attachment/removal button 99 is pressed, a built-in contact goes ON, and the body microprocessor 210 can recognize that the lens attachment/removal button 99 has been pressed.

2.13.2: Imaging Element Unit

An imaging element unit 211 is constituted by the imaging sensor 150 and a shutter unit 155 that is attached inside the camera body 2. The imaging sensor 150 is, for example, a CMOS (complementary metal oxide semiconductor) image sensor that performs opto-electrical conversion. The body mount 4 provided to the front face of the camera body 2 is constituted by an opening 4a that passes through in the Y axis direction in the center, and an attachment component 4b for attaching the lens mount 20. An optical image formed by the optical system O of the lens barrel 3 is formed on the light receiving face of the imaging sensor 150 through this opening 4a.

2.13.3: Image Acquisition Component

The image acquisition component 235 mainly has the imaging sensor 150, the shutter unit 155 that adjusts the exposure state of the imaging sensor 150, a shutter controller 231 that adjusts the drive of the shutter unit 155 on the basis of a control signal from the body microprocessor 210, and an imaging sensor drive controller 212 that controls the operation of the imaging sensor 150.

The drive of the imaging sensor 150 is controlled by a timing signal generated by the imaging sensor drive controller 212. The imaging sensor 150 may also be a CCD (charge coupled device).

The shutter controller 231 drives a shutter drive actuator 232 and actuates a shutter unit 233 according to a control signal outputted from the body microprocessor 210 that has received a timing signal.

In this embodiment, contrast detection, which makes use of image data produced by the imaging sensor 150, is employed as the auto-focus method. Using contrast detection allows more precise focus adjustment to be accomplished.

2.13.4: Body Microprocessor

The body microprocessor 210 is a control device that is the command center of the camera body 2, and controls the various components of the digital camera 1 according to manipulation information inputted to the manipulation unit 239. More specifically, The body microprocessor 210 is equipped with a CPU, ROM, and RAM, and the programs held in the ROM are read by the CPU, allowing the body microprocessor 210 to perform a variety of functions. For instance, the body microprocessor 210 has the function of detecting that the lens barrel 3 has been mounted to the camera body 2, or the function of acquiring from the lens barrel 3 focal distance information and other such information that is necessary for controlling the digital camera 1.

The body microprocessor 210 is able to receive signals from the power switch 5, the shutter button 11, the mode selector dial 6, the cross key 7, the menu setting button 8, and the set button 9. Various information related to the camera body 2 is held in a memory 210a inside the body microprocessor 210. The memory 210a is a nonvolatile memory, and can hold stored information even when the power supply has been halted.

Also, the body microprocessor 210 periodically produces a vertical synchronization signal, and produces an exposure synchronization signal on the basis of the vertical synchronization signal in parallel with the production of the vertical synchronization signal. The body microprocessor 210 can produce an exposure synchronization signal because the exposure start timing and the exposure stop timing have been ascertain beforehand based on the vertical synchronization signal. The body microprocessor 210 outputs a vertical synchronization signal to a timing generator (not shown), and outputs an exposure synchronization signal at a specific period to the lens microprocessor 240 via the body mount 4 and the lens mount 20. The lens microprocessor 240 acquires position information about the second lens frame 50 in synchronization with the exposure synchronization signal.

The imaging sensor drive controller 212 produces an electronic shutter drive signal and a read signal of the imaging sensor 150 at a specific period on the basis of the vertical synchronization signal. The imaging sensor drive controller 212 drives the imaging sensor 150 on the basis of the electronic shutter drive signal and the read signal. That is, the imaging sensor 150 reads to a vertical transfer component (not shown) the pixel data produced by numerous opto-electrical conversion elements (not shown) present in the imaging sensor 150, according to the read signal.

The body microprocessor 210 also controls the focus motor unit 110 via the lens microprocessor 240.

The image signal outputted from the imaging sensor 150 is sent from an analog signal processor 213 and successively processed by an A/D converter 214, a digital signal processor 215, a buffer memory 216, and an image compressor 217. The analog signal processor 213 subjects the image signal outputted from the imaging sensor 150 to gamma processing or other such analog signal processing. The A/D converter 214 converts the analog signal outputted from the analog signal processor 213 into a digital signal. The digital signal processor 215 subjects the image signal converted into a digital signal by the A/D converter 214 to digital signal processing such as noise elimination or contour enhancement. The buffer memory 216 is a RAM (Random Access Memory), and temporarily stores the image signal. The image signal stored in the buffer memory 216 is sent to and processed by first the image compressor 217 and then an image recorder 218. The image signal stored in the buffer memory 216 is read at a command from an image recording controller 219 and sent to the image compressor 217. The data of the image signal sent to the image compressor 217 is compressed into an image signal according to a command from the image recording controller 219. This compression adjusts the image signal to a smaller data size than that of the original data. An example of the method for compressing the image signal is the JPEG (Joint Photographic Experts Group) method in which compression is performed on the image signal for each frame. After this, the compressed image signal is recorded by the image recording controller 219 to the image recorder 218. When a moving picture is recorded, the JPEG method can be used to compress a plurality of image signals, compressing an image signal for each frame, and an H.264/AVC method can also be used, in which compression is performed on image signals for a plurality of frames all at once.

The image recorder 218 produces a still picture file or moving picture file that is associated with specific information to be recorded with the image signal, on the basis of a command from the image recording controller 219. The image recorder 218 then records the still picture file or moving picture file on the basis of a command from the image recording controller 219. The image recorder 218 is a removable memory and/or an internal memory, for example. The specific information to be recorded with the image signal includes the date and time the image was captured, focal distance information, shutter speed information, aperture value information, and imaging mode information. Still picture files are in Exif® format or a format similar to Exif® format, for example. Moving picture files are in a format similar to H.264/AVC format, for example.

2.13.5: Image Display Component

An image display component 236 has the display component 10 and an image display controller 221. The display component 10 is a liquid crystal monitor, for example. The display component 10 displays the image signal recorded to the image recorder 218 or the buffer memory 216 as a visible image on the basis of a command from the image display controller 221. Possible display formats on the display component 10 include a display format in which only an image signal is displayed as a visible image, and a display format in which information about the time of capture and the image signal are displayed as a visible image.

2.13.6: Viewfinder Component

A viewfinder component 238 has the liquid crystal viewfinder 208 that displays images acquired by the imaging sensor 150, and the viewfinder eyepiece window 12 provided to the rear face of the camera body 2. The user can visually check the image displayed on the liquid crystal viewfinder 208 by looking into the viewfinder eyepiece window 12.

2.13.7: Battery

A battery 222 supplies power to the various components of the camera body 2, and supplies power through the lens mount 20 to the lens barrel 3. In this embodiment, the battery 222 is a rechargeable battery. The battery 222 may be a dry cell, or may be an external power supply with which power is supplied from the outside with a power cord.

3: Operation of Digital Camera

The operation of the digital camera 1 will be described through reference to FIGS. 1, 2, 3, 17, and 18.

3.1: Operation when Power is on

The manipulation unit 239 has various manipulation members that the user can use to input manipulation information. For example, the power switch 5 is used to turn the power on and off to the digital camera 1 or the camera body 2. When the power is switched on with the aperture unit power switch 5, power is supplied to the various components of the camera body 2 and an interchangeable lens unit 2.

This digital camera 1 has two imaging modes. More specifically, the digital camera 1 has a viewfinder imaging mode in which the user looks at the subject through the viewfinder eyepiece window 12, and a monitor imaging mode in which the user looks at the subject on the display component 10.

In viewfinder imaging mode, for example, the image display controller 221 drives the liquid crystal viewfinder 208. As a result, an image of the subject acquired by the imaging sensor 150 is displayed on the liquid crystal viewfinder 208.

In monitor imaging mode, for example, the display component 10 is driven by the image display controller 221, and a real-time image of the subject is displayed on the display component 10.

3.2 Still Picture Imaging

When the user presses the shutter button 11 all the way down, a command is sent from the body microprocessor 210 to the lens microprocessor 240 so that the aperture value of the optical system L will be set to the aperture value calculated on the basis of the light metering output of the imaging sensor 150. The aperture drive controller 242 is controlled by the lens microprocessor 240, and the aperture unit 45 is stopped down to the indicated aperture value. Simultaneously with the indication of the aperture value, a drive command is sent from the imaging sensor drive controller 212 to the imaging sensor 150, and a drive command for the shutter unit 233 is sent out. The imaging sensor 150 is exposed by the shutter unit 11 for a length of time corresponding to the shutter speed calculated on the basis of the light metering output of the imaging sensor 150.

The body microprocessor 210 executes imaging processing and, when the imaging is completed, sends a control signal to the image recording controller 219. The image recorder 218 records an image signal to an internal memory and/or removable memory on the basis of the command of the image recording controller 219. The image recorder 218 records imaging mode information (whether auto-focus imaging mode or manual focus imaging mode is to be used) along with the image signal to the internal memory and/or removable memory on the basis of the command of the image recording controller 219.

Upon completion of the exposure, the imaging sensor drive controller 212 reads image data from the imaging sensor 150, and after specific image processing, image data is outputted via the body microprocessor 210 to the image display controller 221. Consequently, the captured image is displayed on the display component 10.

Also, upon completion of the exposure, the shutter unit 233 is reset to its initial position by the body microprocessor 210. The body microprocessor 210 issues a command to the lens microprocessor 240 for an aperture drive controller 242 to reset the aperture unit 45 to its open position, and a reset command is sent from the lens microprocessor 240 to the various units. Upon completion of this resetting, the lens microprocessor 240 tells the body microprocessor 210 that resetting is complete. After the resetting completion information has been received from the lens microprocessor 240, and after a series of post-exposure processing has been completed, the body microprocessor 210 confirms that the shutter button 11 has not been pressed, and the imaging sequence is concluded.

3.3: Moving Picture Imaging

The digital camera 1 also has the function of capturing moving pictures. In moving picture imaging mode, image data is produced by the imaging sensor 150 at a specific period, and the image data thus produced is utilized to continuously carry out auto-focusing by contrast detection method. In moving picture imaging mode, if the shutter button 11 is pressed, or if the moving picture imaging button 14 is pressed, a moving picture is recorded to the image recorder 218, and when the shutter button 11 or the moving picture imaging button 14 is pressed again, recording of the moving picture by the image recorder 218 is stopped.

3.4: Contrast AF Operation

Figure 17:
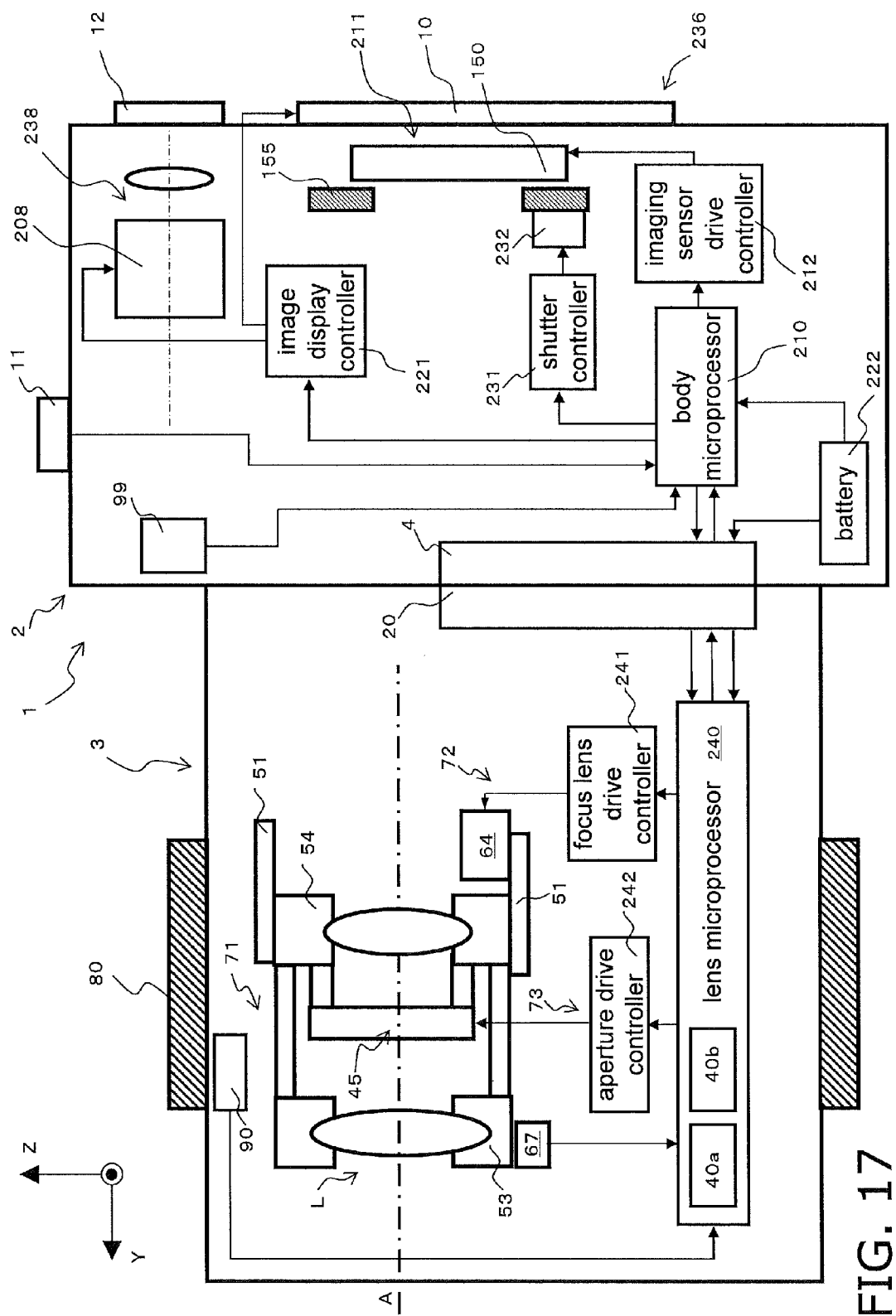
FIG. 17 is a simplified diagram of the configuration of a digital camera.
Figure 18:
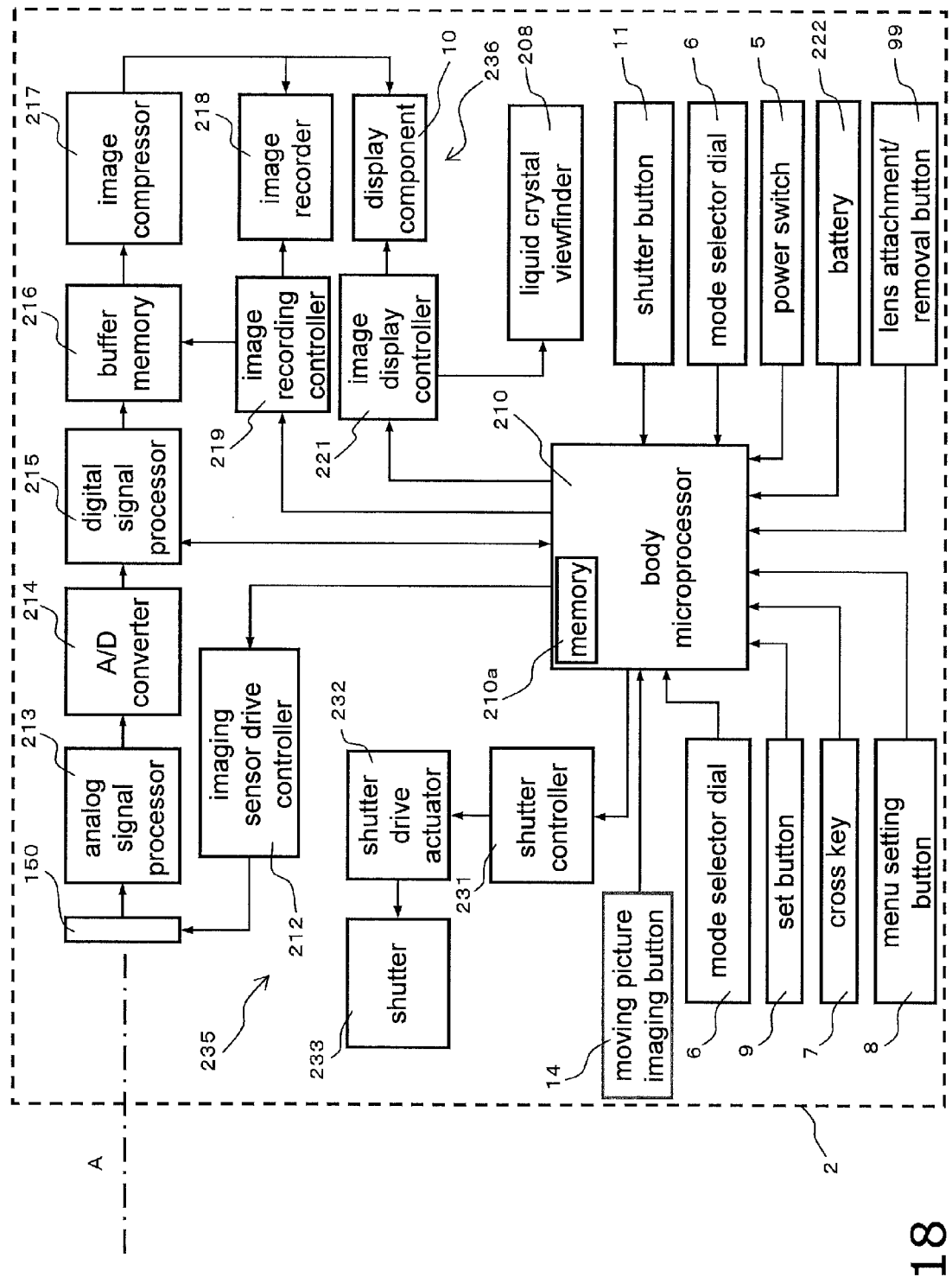
FIG. 18 is a simplified block diagram of the configuration of a camera body.
Figure 19:
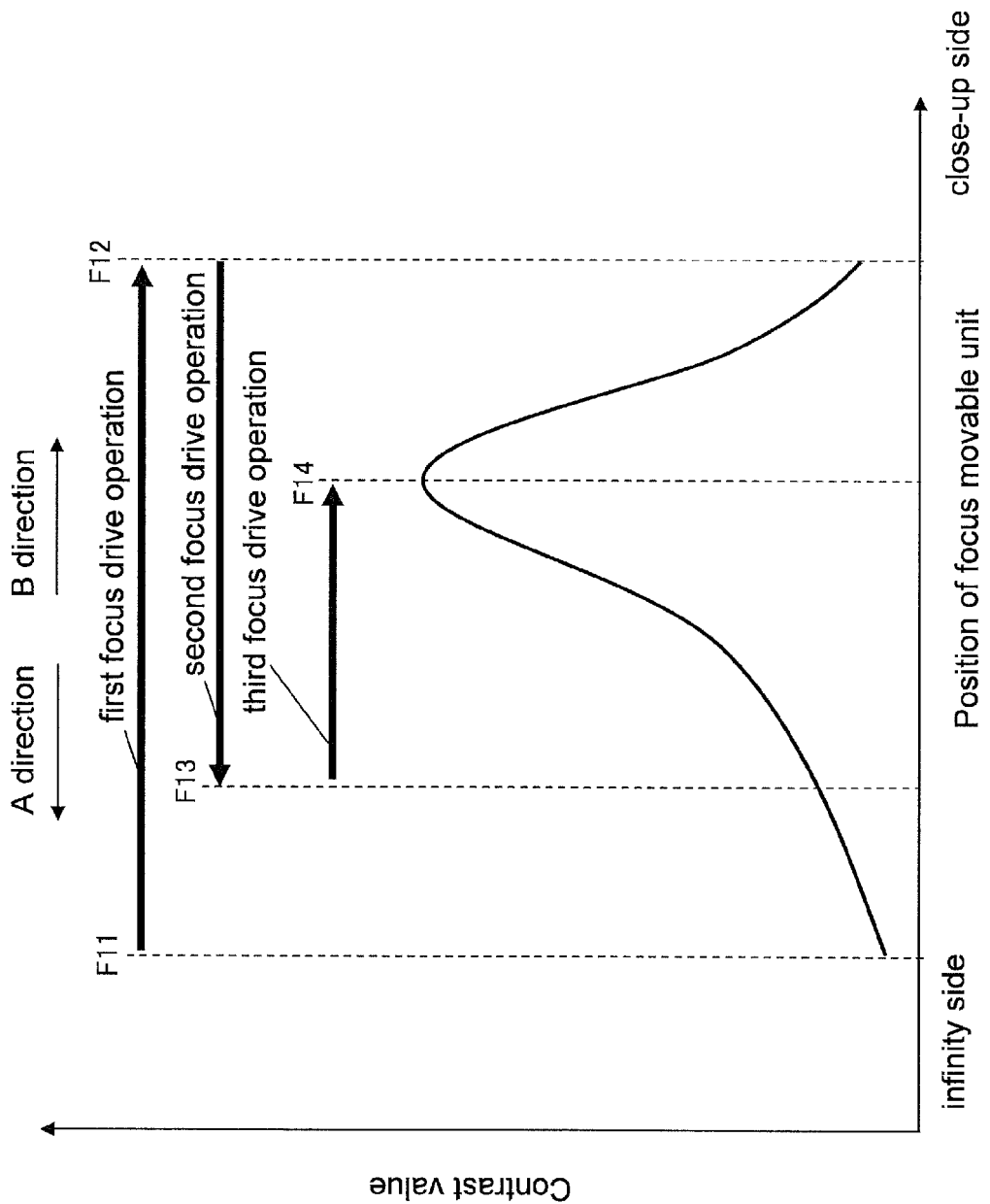
FIG. 19 is a diagram of the operation of contrast autofocus.

The contrast detection method used with the digital camera 1 will now be described through reference to FIGS. 17 to 19. FIG. 19 is a diagram illustrating the operation of a focus lens (second lens frame 50) in this contrast detection method. The vertical axis in FIG. 19 is the contrast value, and the greater is the contrast value, the better the focus. The horizontal axis in FIG. 19 is the position of the focus lens (second lens frame 50) in the optical axis direction; moving to the right in the graph, the focus is increasingly on a close-up subject, and moving to the left, the focus is increasingly on a subject at infinity.

When the shutter button 11 is pushed half-way down by the user, a timing signal is outputted to the body microprocessor 210, and the digital camera 1 changes to contrast AF operation.

When the camera changes to contrast AF operation, the digital camera 1 performs a first focus drive operation, in which the peak contrast value is detected and the focal position is predicted. The body microprocessor 210 issues a command for the contrast detection speed at which the focus lens (second lens frame 50) is operated and the detection in which the focus lens (second lens frame 50) is operated with respect to the lens microprocessor 240. The lens microprocessor 240 sends a command to the focus lens drive controller 241 on the basis of the command from the body microprocessor 210, and the focus motor 111 is driven by the focus lens drive controller 241.

The focus motor 111 moves the focus lens (second lens frame 50) from the detection start position F11 to the detection end position F12 via the lead screw 111a and the nut 112. Here, the imaging sensor 150 outputs image data at the timing intervals of the exposure synchronization signal from the detection start position F11 to the detection end position F12. The body microprocessor 210 detects the contrast value for each set of image data.

Furthermore, the body microprocessor 210 acquires position information about the focus lens (second lens frame 50) from the focus lens drive controller 241 for each timing interval of the exposure synchronization signal. The body microprocessor 210 associates the position information about the focus lens (second lens frame 50) with the contrast values acquired for each timing interval of the exposure synchronization signal, and stores this in the memory 210a. The body microprocessor 210 predicts the position of the focus lens (second lens frame 50) at which the contrast value will be at its peak (the peak position F14) on the basis of the distribution of the contrast values and the position information about the focus lens (second lens frame 50) (that is, it predicts the focal position). When prediction of the peak position is finished, the digital camera 1 changes to a second focus drive operation. During the first focus drive operation, if the body microprocessor 210 determines that the contrast value has decreased through the movement of the focus lens (second lens frame 50), then the body microprocessor 210 reverses the direction in which the focus lens (second lens frame 50) is operated, and performs the first focus drive operation over again.

In the second focus drive operation, first the body microprocessor 210 issues commands to the lens microprocessor 240 for the drive speed of the focus motor 111 and the target position F13 of the focus lens (second lens frame 50), which is over the peak position F14 of the contrast value as viewed from the current position F12. As to the drive speed here, a command for a "set speed" that is as high as possible is issued in order for the focus lens (second lens frame 50) to reach the target position F13 as quickly as possible. Once the focus lens (second lens frame 50) reaches the target position F13, the second focus drive operation is ended and the operation changes to a third focus drive operation, under a command from the body microprocessor 210. The "set speed" will be discussed below.

The body microprocessor 210 issues commands to the lens microprocessor 240 for the drive speed of the focus motor 111 and the peak position F14 of the contrast value (serving as a target value). A command is issued for the drive speed here to be the "set speed" just as in the second focus drive operation. When the focus lens (second lens frame 50) reaches the target position F13, the third focus drive operation is ended, and the focusing operation is ended, on the basis of a command from the body microprocessor 210. The contrast value is not calculated during the second focus drive operation or during the third focus drive operation.

The reason the drive does not go all the way to the peak position F14, which is the peak position of the contrast value, immediately after the end of the first focus drive operation is that backlash is caused by looseness between the nut 112 and the rotation restricting groove 62 of the nut when the movement direction of the focus lens (second lens frame 50) changes, and error corresponding to the backlash occurs. To reduce this error caused by backlash, the focal position detection direction in the first focus drive operation and the focal position movement direction in the third focus drive operation are made the same direction, so that the error corresponding to backlash is smaller. Accordingly, when there is little variance in backlash due to orientation error or repetition error, the focusing operation may be ended by extra operation corresponding to the backlash correction to a target focal position F14 in the second focus drive operation.

The auto-focus operation is preferably as quick as possible. Therefore, it is preferable to move a focus movable unit 250 to the focus position as quickly as possible. However, the drive speed of the focus lens (second lens frame 50) as commanded by the body microprocessor 210 in the first focus drive operation is set to a speed that is lower than the "set speed" so that the body microprocessor can predict the focus position more accurately. If the "set speed" of the focus motor 111 is lower than the drive speed of the focus lens (second lens frame 50) as commanded by the body microprocessor 210, a limit will be imposed by the lens microprocessor, and drive will be at the "set speed."

With a contrast AF method, good positioning precision to the focus prediction position is required, so a stepping motor is used for the focus motor 111. With a stepping motor, the rotational angle varies according to the inputted drive pulses, so this motor allows position control without the use of an external sensor, and is therefore widely used in digital cameras featuring contrast AF. However, if the resistance (load torque) hindering rotation is too strong, or if the drive speed (output torque) is too high, the number of drive pulses will no longer be synchronized (will be out of step) with the rotational angle. Accordingly, the drive speed (output torque) must be set extra high to account for load torque, temperature characteristics, and so on.

3.5: Manual Focus Operation

The manual focus switching button (not shown) is turned ON in order to activate the manual focus operation. When the manual focus switching button is switched ON, and the focus ring 81 is turned by the user, detection signals from the photointerrupters 82 and 83 are sent to the lens microprocessor 240, and the focus motor 111 is driven to the desired focal position by movement of the second lens frame in the Y axis direction.

Second Embodiment

Figure 20:
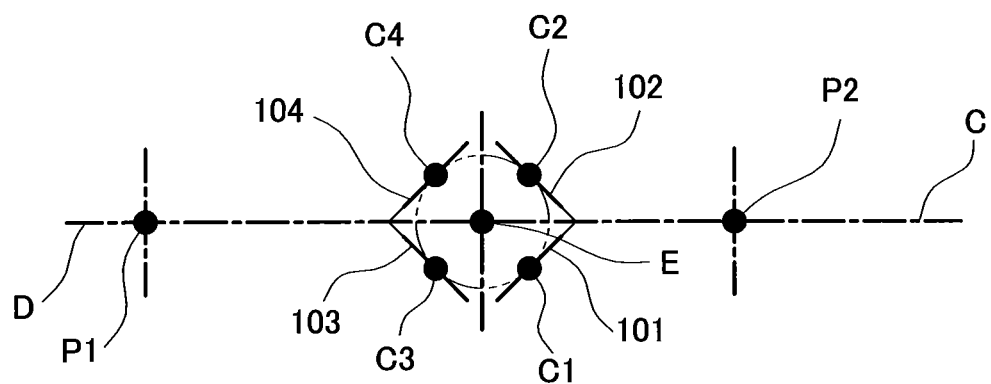
FIG. 20 is a plan view of the second lens frame biasing force in a second working example.
Figure 21:
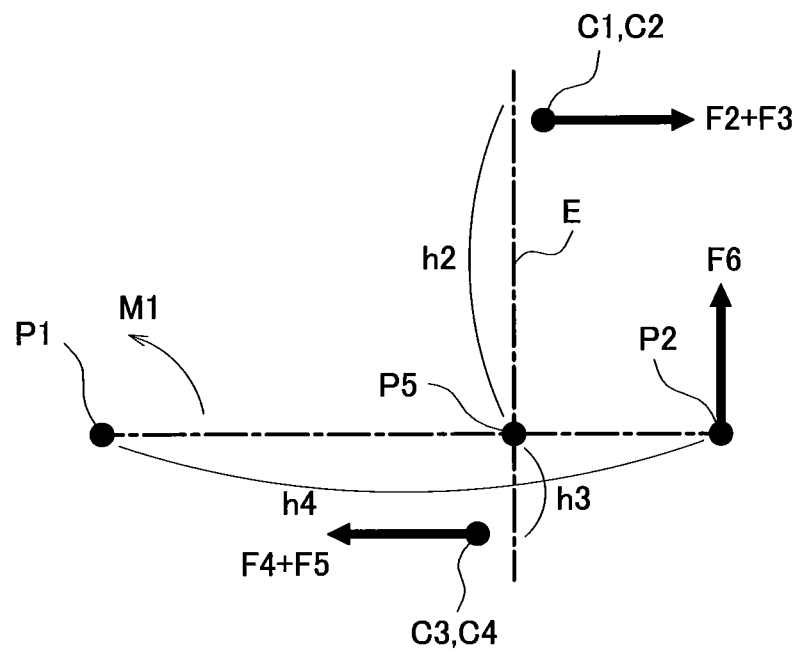
FIG. 21 is a side view of the second lens frame biasing force in a second working example.

In the first embodiment, the tension spring 123 is disposed between the focus motor 111 and the main shaft 120 when viewed in the Y axis direction, but this is not required. FIG. 20 is a plan view of a second embodiment when viewed in the Y axis direction, and FIG. 21 is a side view. In FIGS. 20 and 21, those components having the same function as in FIGS. 15 and 16 are numbered the same and will not be described again.

As shown in FIGS. 20 and 21, a spring action point P2 is disposed along a substantially straight line between the second center point P5 of the main shaft 120 and the first center point P1 of the lead screw 111a of the focus motor 111 (FIG. 20), and the distance h4 between the first center point P1 of the lead screw 111a and the spring action point P2 is greater than the distance between the second center point P5 of the main shaft 120 and the first center point P1 of the lead screw 111a.

The balance between the moment M1 and the reaction force can be expressed by the following equation.

$$M1(=F1 \times h1)=(F2+F3) \times h2+(F4+F5) \times h4$$

In the above equation, the moment M1 must have a specific magnitude in order to hold the orientation of the second lens frame 50 stable against external forces on the digital camera 1, orientation difference in the digital camera 1, etc. Thus, by increasing the distance h4, the necessary moment M1 can be generated even if the tensile force F6 of the tension spring 300 is low. Specifically, the tensile force F6 can be made smaller than the biasing force F1 of the tension spring 123 in FIGS. 15 and 16, so the drive load is lighter on the stepping motor 111 that drives the nut 112. As a result, the stepping motor 111 can be smaller, and a more compact lens barrel can be obtained.

Third Embodiment

Figures 22, 23:
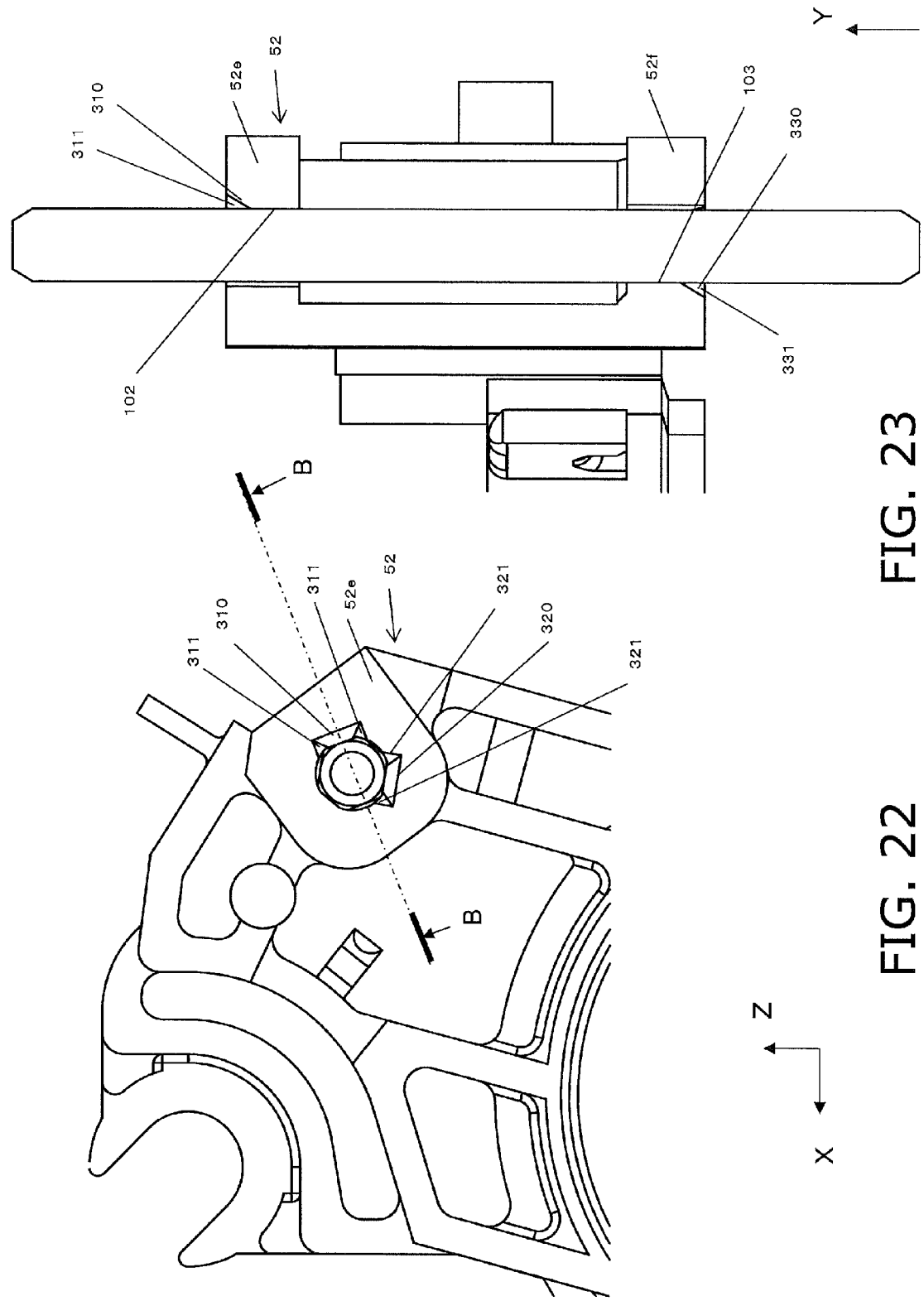
FIG. 22 is a simplified plan view of near the second lens frame bearing in a third working example.
FIG. 23 is a simplified cross section of near the second lens frame bearing in a third working example.

FIG. 22 is a partial plan view of near the bearing of the main shaft 120 of the second lens frame 50 pertaining to the third embodiment, and FIG. 23 is a simplified cross section of near bearing of the main shaft 120 of the second lens frame 50 pertaining to the third embodiment.

As shown in FIGS. 22 and 23, a middle tapered part 320 and a pair of lateral tapered parts 321 are formed toward the first flat face 101 of the upper bearing component 52e. Also, a middle tapered part 310 and a pair of lateral tapered parts 311 are formed toward the second flat face 102 of the upper bearing component 52e. Also, a middle tapered part 330 and a pair of lateral tapered parts 331 are formed toward the third flat face 103 of the upper bearing component 52e. Although not depicted, similar tapers are formed on the fourth flat face 104 of the lower bearing component 52f.

The area between the main shaft 120 and the first bearing component 52 is coated with lubricating grease, so that the second lens frame 50 will move smoothly with respect to the main shaft 120. However, high pressure is exerted at the contact points c1 to c4 between the first bearing component 52 and the main shaft 120, so the grease tends to flow out from the contact points c1 to c4.

In view of this, tapers are formed in the peripheral direction so that the grease flowing to the periphery will be sent back into the contact points c1 to c4. Tapers are formed on the lower bearing component 52f for the same reason as on the upper bearing component 52e. These tapers allow the great that has flowed out peripherally from the contact points c1 to c4 to be collected again, and thus afford a lens barrel with higher reliability.

General Interpretation of Terms

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" and "element" when used in the singular can have the dual meaning of a single part or a plurality of parts. Also as used herein to describe the above embodiment(s), the following directional terms "forward," "rearward," "above," "downward," "vertical," "horizontal," "below," and "transverse" as well as any other similar directional terms refer to those directions of the lens barrel. Accordingly, these terms, as utilized to describe the present invention, should be interpreted relative to the lens barrel.

The term "configured" as used herein to describe a component, section or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed. While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lens barrel comprising:
a lens frame configured to support a lens group having an optical axis;
a guide shaft having a guide axis, the guide shaft being disposed parallel to the optical axis of the lens group and inserted into the lens frame;
a lead screw disposed parallel to the optical axis;
a nut threaded onto the lead screw; and
a biasing member configured to urge the lens frame toward the nut in a position away from the lead screw,
the lens frame including a first bearing component and a second bearing component, the first component having a first insertion hole into which the guide shaft is inserted, the second bearing component having a second insertion hole into which the guide shaft is inserted,
the guide shaft being configured to contact an inner peripheral face of the first insertion hole at a first contact point and a second contact point by an urging force of the biasing member, the guide shaft being further configured to contact an inner peripheral face of the second insertion hole at a third contact point and a fourth contact point by the urging force of the biasing member, and
the first contact point and the second contact point being disposed opposite to the third contact point and the fourth contact point with a parallel plane located in-between as a reference, the parallel plane being disposed along the direction of the optical axis and passing through the guide axis of the guide shaft.

2. The lens barrel according to claim 1, wherein
the first contact point and the second contact point are arranged symmetrical with the third contact point and the fourth contact point around a specific point on the guide axis.

3. The lens barrel according to claim 1, wherein
a first center point disposed between the first contact point and the second contact point is connected by a first line to a second center point disposed between the third contact point and the fourth contact point, the first line being parallel to a second line that connects the lead screw axis and a latching point where the biasing member latches the lens frame when viewed along the direction of the optical axis.

4. The lens barrel according to claim 3, wherein
the distance between the lead screw axis and the latching point is greater than the distance between the lead screw axis and the guide axis when viewed along the direction of the optical axis.

* * * * *